US011591004B2

(12) United States Patent
Sugishita et al.

(10) Patent No.: US 11,591,004 B2
(45) Date of Patent: Feb. 28, 2023

(54) BRACKET AND STEERING APPARATUS

(71) Applicant: NSK Ltd., Tokyo (JP)

(72) Inventors: Suguru Sugishita, Gunma (JP); Hikaru Okabe, Gunma (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 17/276,232

(22) PCT Filed: Sep. 18, 2019

(86) PCT No.: PCT/JP2019/036607
§ 371 (c)(1),
(2) Date: Mar. 15, 2021

(87) PCT Pub. No.: WO2020/059764
PCT Pub. Date: Mar. 26, 2020

(65) Prior Publication Data
US 2022/0048554 A1 Feb. 17, 2022

(30) Foreign Application Priority Data

Sep. 19, 2018 (JP) .............................. JP2018-174482
Sep. 19, 2018 (JP) .............................. JP2018-174483

(51) Int. Cl.
*B62D 1/184* (2006.01)
*B62D 1/189* (2006.01)
*B62D 1/181* (2006.01)

(52) U.S. Cl.
CPC .............. *B62D 1/184* (2013.01); *B62D 1/189* (2013.01); *B62D 1/181* (2013.01)

(58) Field of Classification Search
CPC ........ B62D 1/184; B62D 1/189; B62D 1/181; B62D 1/16
See application file for complete search history.

(56) References Cited

U.S. PATENT DOCUMENTS

| 8,056,435 | B2* | 11/2011 | Jin ........................ B62D 1/184 |
| | | | 280/775 |
| 2006/0043720 | A1 | 3/2006 | Sawada et al. |
| 2018/0327017 | A1* | 11/2018 | Suzuki .................. B62D 1/184 |
| 2020/0331514 | A1* | 10/2020 | Strong .................. B62D 1/184 |

FOREIGN PATENT DOCUMENTS

| JP | 55-104554 U | 7/1980 |
| JP | 06-67258 U | 9/1994 |
| JP | 08-230686 A | 9/1996 |
| JP | 2003-226159 A | 8/2003 |
| JP | 2006-044457 A | 2/2006 |
| JP | 2008-008451 A | 1/2008 |
| JP | 2009-062031 A | 3/2009 |
| JP | 2018-131058 A | 8/2018 |
| JP | 2018-131059 A | 8/2018 |
| WO | 2004/043766 A1 | 5/2004 |
| WO | 2017/142982 A1 | 8/2017 |

OTHER PUBLICATIONS

International Search Report of PCT/JP2019/036607 dated Dec. 3, 2019 [PCT/ISA/210].

* cited by examiner

*Primary Examiner* — Drew J Brown
(74) *Attorney, Agent, or Firm* — Sughrue Mion, PLLC

(57) ABSTRACT

A bracket includes a first plate that faces a steering column, a second plate that faces a column cover covering the steering column, and a third plate that connects the first plate and the second plate, and a fourth plate that intersects with the first plate and the third plate.

10 Claims, 32 Drawing Sheets

BRACKET AND STEERING APPARATUS

CROSS REFERENCE TO RELATED APPLICATIONS

This application is a National Stage of International Application No. PCT/JP2019/036607, filed Sep. 18, 2019, claiming priority to Japanese Patent Application No. 2018-174482, filed Sep. 19, 2018 and Japanese Patent Application No. 2018-174483, filed Sep. 19, 2018.

FIELD

The present disclosure relates to a bracket and a steering apparatus.

BACKGROUND

Vehicles are provided with a steering apparatus as a device for communicating operations performed on a steering wheel by an operator (driver) to the wheels. A steering shaft for communicating a rotation of the steering wheel to the wheels is supported by a steering column. The steering apparatus is provided with a column cover that covers the cabin-side end of the steering column. Patent Literature 1 discloses one example of a bracket for supporting such a column cover.

CITATION LIST

Patent Literature

Patent Literature 1: Japanese Patent Application Laid-open No. 2006-44457

SUMMARY

Technical Problem

To the bracket for supporting the column cover, sometimes members other than the column cover are attached. When the bracket becomes deformed, the position where the column cover is attached becomes displaced. Therefore, there is a demand for a bracket capable of suppressing a displacement of the position where the column cover is attached.

The present disclosure is made in consideration of the above, and an object of the present disclosure is to provide a bracket capable of suppressing a displacement of the position where the column cover is attached.

Solution to Problem

To achieve the above object, A bracket according to the present disclosure comprising: a first plate that faces a steering column; a second plate that faces a column cover covering the steering column; a third plate that connects the first plate and the second plate; and a fourth plate that intersects with the first plate and the third plate.

Because the fourth plate intersects with the first plate and the third plate, the rigidity of the bracket is increased. In this manner, even when any member other than the column cover is attached to the bracket, it is possible to suppress a deformation of the bracket. Therefore, with this bracket, it is possible to suppress a displacement of the position where the column cover is attached.

As a desirable aspect of the above bracket, the bracket further comprising a welding bead that is in contact with the first plate and the fourth plate. In this manner, the rigidity of the bracket is further increased. Therefore, with this bracket, it is possible to further suppress a displacement of the position where the column cover is attached.

As a desirable aspect of the above bracket, the fourth plate intersects with the second plate.

Because the fourth plate intersects with the first plate, the second plate, and the third plate, the rigidity of the bracket is increased. In this manner, even when any member other than the column cover is attached to the bracket, it is possible to suppress a deformation of the bracket. Therefore, with this bracket, it is possible to suppress a displacement of the position where the column cover is attached.

As a desirable aspect of the above bracket, the third plate has a first end hole that is disposed at an end on a side of the fourth plate, the fourth plate has a second end hole that is disposed at an end on a side of the third plate, and the second end hole is connected with the first end hole. In this manner, when the bracket is manufactured by plastically deforming one plate, the formability of the bracket can be improved. It is possible to manufacture the bracket easily, and to improve the precision of the shape.

As a desirable aspect of the above bracket, the first plate has a first attachment hole through which an attaching member for attaching the first plate to the steering column is passed, and the second plate is offset from the first attachment hole in a plan view perpendicular to a passing direction through the first attachment hole.

In this manner, it is possible to insert the attaching member into the first attachment hole from the side of the second plate. With this bracket, it is possible to improve the easiness of the task of attaching the bracket to the steering column.

As a desirable aspect of the above bracket, the third plate has a clip hole to which a clip for supporting the wire harness is attached. In this manner, with this bracket, it is possible to improve the easiness of the task of attaching the wire harness.

To achieve the above object, a steering apparatus according to the present disclosure comprising: the above bracket; and the steering column. In this manner, with this steering apparatus, it is possible to suppress a displacement of the position where the column cover is attached.

As a desirable aspect of the above steering apparatus, the steering apparatus further comprising: a recess that is provided to one of the steering column and the first plate, and a protrusion that is provided to one of the steering column and the first plate, and that is fitted into the recess.

In this manner, the bracket is positioned by the recess and the protrusion. As long as there is at least one attaching member, it is possible to attach the bracket to the steering column, and to position the bracket. With this steering apparatus, it is possible to improve the easiness of the task of attaching the bracket.

As a desirable aspect of the above steering apparatus, the bracket is disposed under the steering column. In this manner, it is possible to attach the column cover to the bracket from the opposite side of the vehicle body, with respect to the steering column. With this steering apparatus, it is possible to improve the easiness of the task of attaching the column cover.

Advantageous Effects of Invention

According to the present disclosure, it is possible to provide a bracket capable of suppressing a displacement of the position where the column cover is attached.

DESCRIPTION OF EMBODIMENTS

The present invention will now be explained in detail with reference to some drawings. The embodiments for implementing the present invention described below (hereinafter, referred to as embodiments) are not intended to limit the scope of the present invention in any way. Furthermore, the elements described in the embodiments include those that can be easily thought of by those skilled in the art, those that are substantially the same, and those that fall within what is called the scope of equivalent. Furthermore, the elements disclosed in the embodiment below may be combined as appropriate.

First Embodiment

Figure 1:
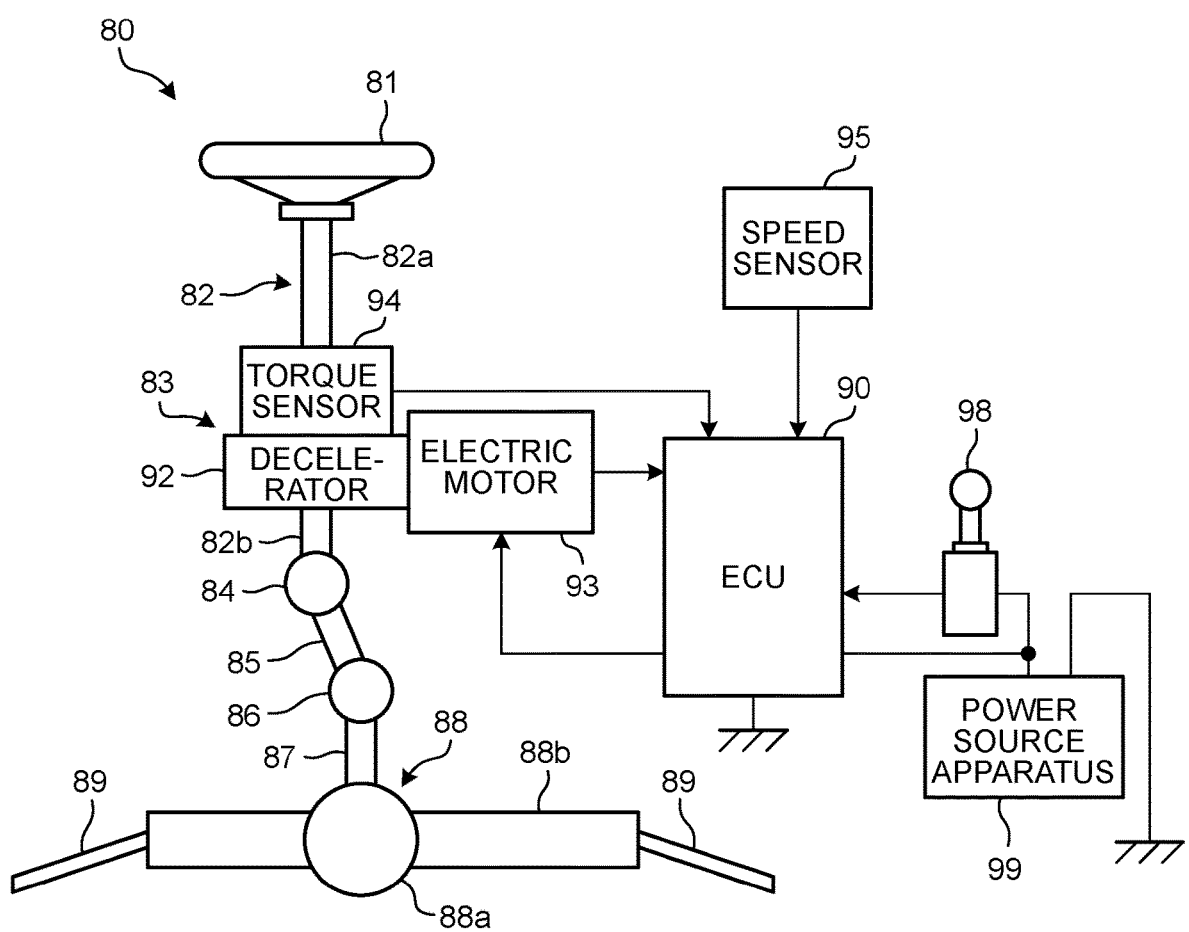
FIG. 1 is a schematic of a steering apparatus according to a first embodiment.

FIG. 1 is a schematic of a steering apparatus according to a first embodiment. As illustrated in FIG. 1, this steering apparatus 80 includes a steering wheel 81, a steering shaft 82, a steering effort assisting mechanism 83, a first universal joint 84, an intermediate shaft 85, and a second universal joint 86.

As illustrated in FIG. 1, the steering shaft 82 includes an input shaft 82a and an output shaft 82b. One end of the input shaft 82a is connected to the steering wheel 81. The other end of the input shaft 82a is connected to the output shaft 82b. One end of the output shaft 82b is connected to the input shaft 82a. The other end of the output shaft 82b is connected to the first universal joint 84.

As illustrated in FIG. 1, the intermediate shaft 85 connects the first universal joint 84 and the second universal joint 86. One end of the intermediate shaft 85 is connected to the first universal joint 84. The other end of the intermediate shaft 85 is connected to the second universal joint 86. One end of pinion shaft 87 is connected to the second universal joint 86. The other end of the pinion shaft 87 is connected to a steering gear 88.

The first universal joint 84 and the second universal joint 86 are Cardan joints, for example. The rotation of the steering shaft 82 is communicated to the pinion shaft 87 via the intermediate shaft 85. In other words, the intermediate shaft 85 is rotated with the steering shaft 82. The second universal joint 86 is connected to the pinion shaft 87.

As illustrated in FIG. 1, the steering gear 88 includes a pinion 88a and a rack 88b. The pinion 88a is connected to the pinion shaft 87. The rack 88b is meshed with the pinion 88a. The steering gear 88 converts the rotational movement communicated to the pinion 88a to a linear movement with the rack 88b. The rack 88b is connected to tie rods 89. The angle of the wheels is changed as the rack 88b is moved.

As illustrated in FIG. 1, the steering effort assisting mechanism 83 includes a decelerator 92 and an electric motor 93. The decelerator 92 is a worm decelerator, for example. The torque generated in the electric motor 93 is communicated to a worm wheel via a worm provided internal of the decelerator 92, and causes the worm wheel to rotate. The decelerator 92 increases the torque generated in the electric motor 93 with the worm and the worm wheel. The decelerator 92 gives an assisting steering torque to the output shaft 82b. In other words, the steering apparatus 80 is based on column assist steering.

As illustrated in FIG. 1, the steering apparatus 80 includes an electronic control unit (ECU) 90, a torque sensor 94, and a speed sensor 95. The electric motor 93, the torque sensor 94, and the speed sensor 95 are electrically connected to the ECU 90. The torque sensor 94 outputs the steering torque communicated to the input shaft 82a to the ECU 90 via communication over a controller area network (CAN). The speed sensor 95 detects the travelling speed of the vehicle that has the steering apparatus 80 onboard (vehicle speed). The speed sensor 95 is provided to a vehicle body, and outputs the vehicle speed to the ECU 90 via the CAN communication.

The ECU 90 controls the operation of the electric motor 93. The ECU 90 acquires signals from the torque sensor 94 and the speed sensor 95. While an ignition switch 98 is ON, the power from a power source apparatus 99 (onboard battery, for example) is kept supplied to the ECU 90. The ECU 90 calculates an assisting steering command value based on the steering torque and the vehicle speed. The ECU 90 adjusts the level of the power to be supplied to the electric motor 93 based on the assisting steering command value. The ECU 90 acquires information of the induced voltage from the electric motor 93, or information output from a resolver or the like provided to the electric motor 93. The effort required in operating the steering wheel 81 is reduced by causing the ECU 90 to control the electric motor 93.

Figure 2:
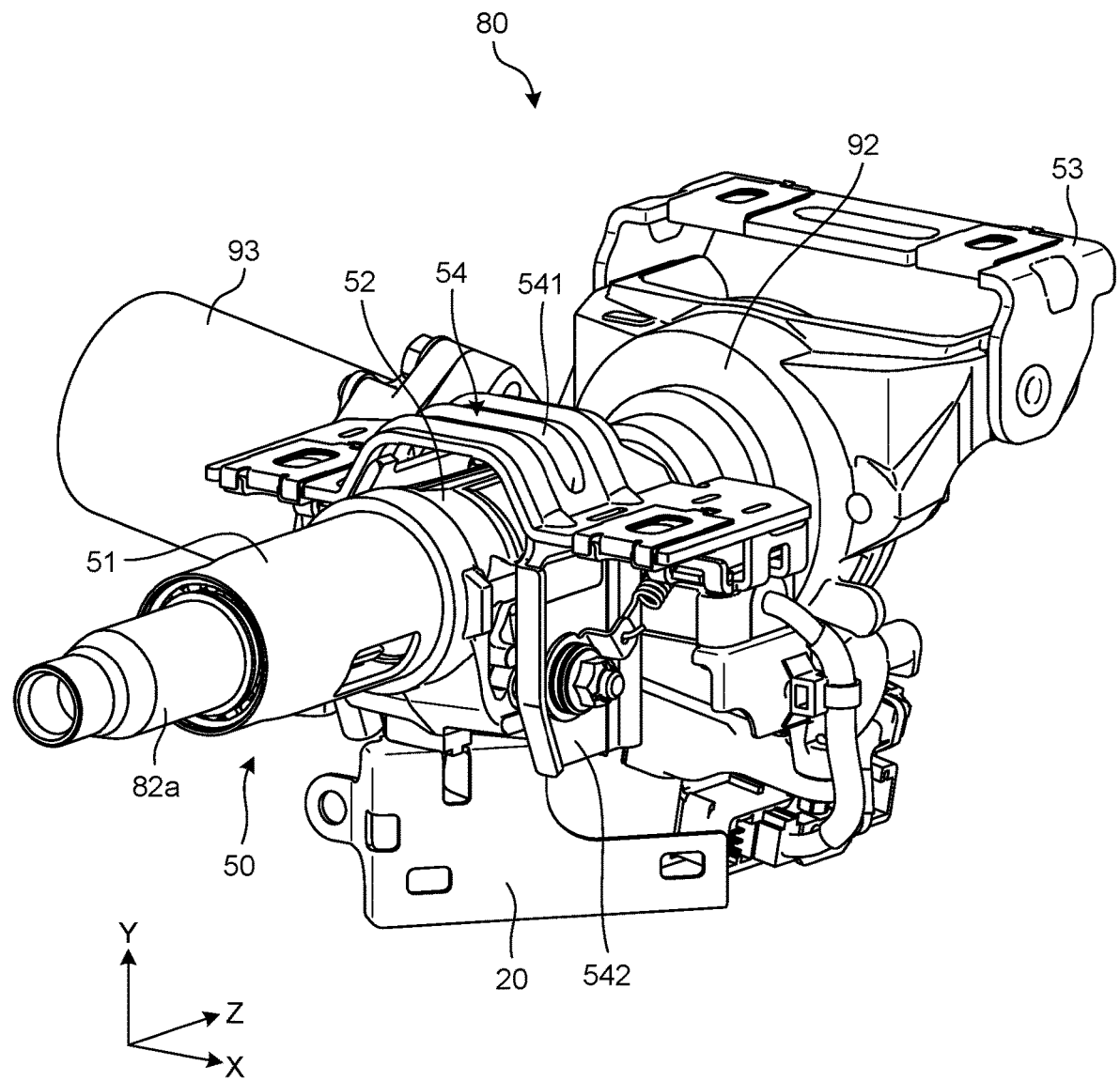
FIG. 2 is a perspective view of the steering apparatus according to the first embodiment.
Figure 3:
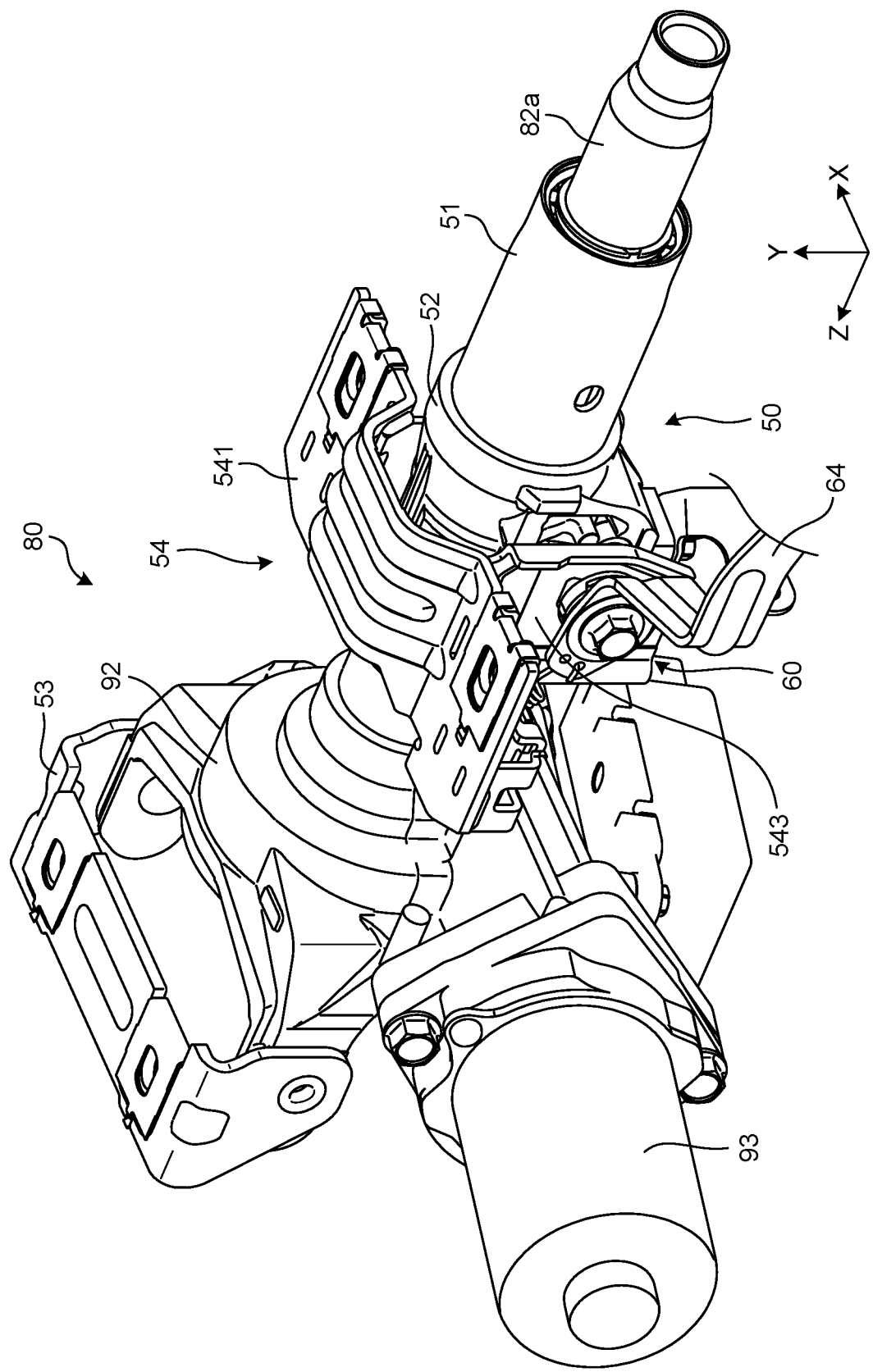
FIG. 3 is a perspective view of the steering apparatus according to the first embodiment.
Figure 4:
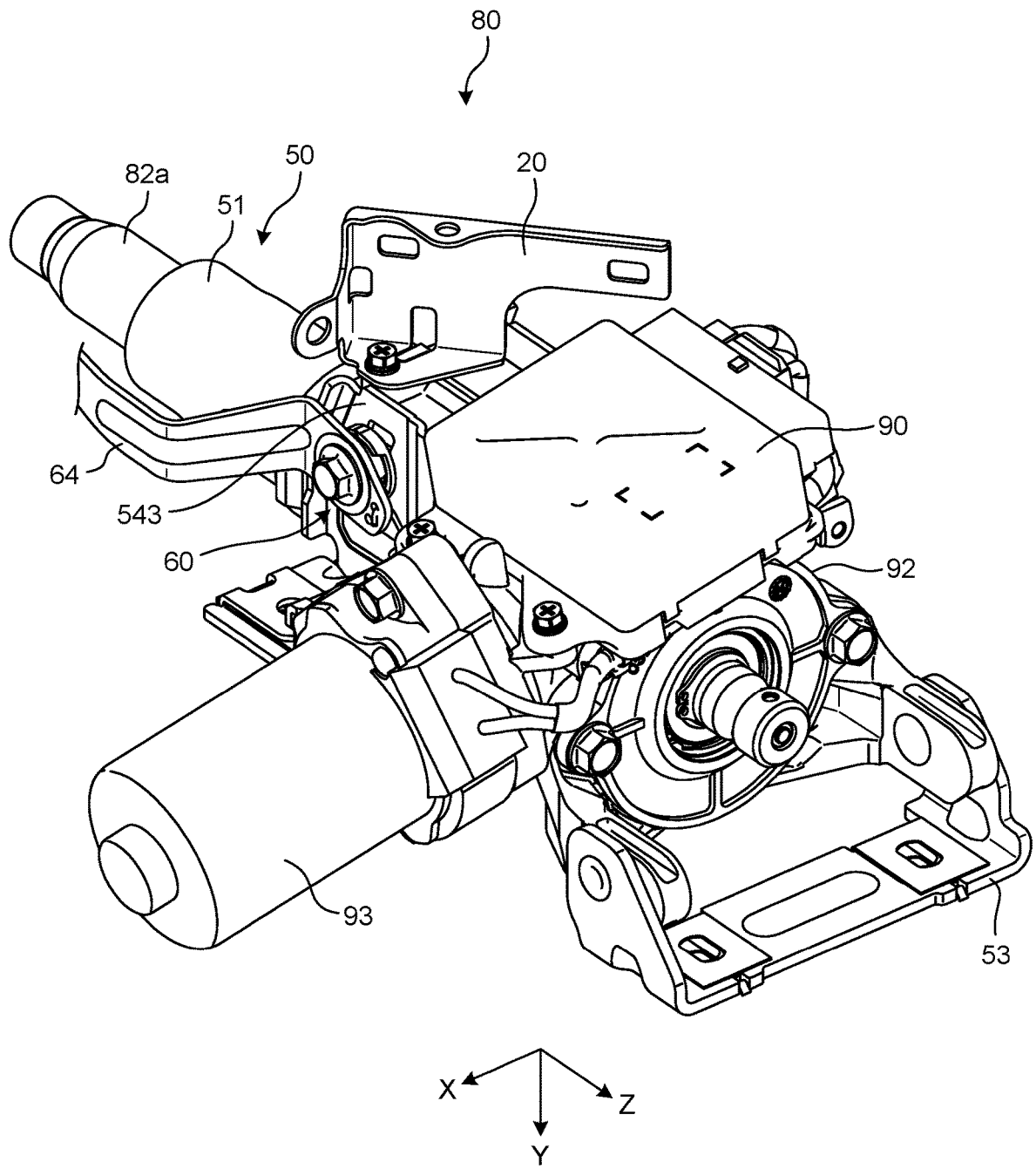
FIG. 4 is a perspective view of the steering apparatus according to the first embodiment.
Figure 5:
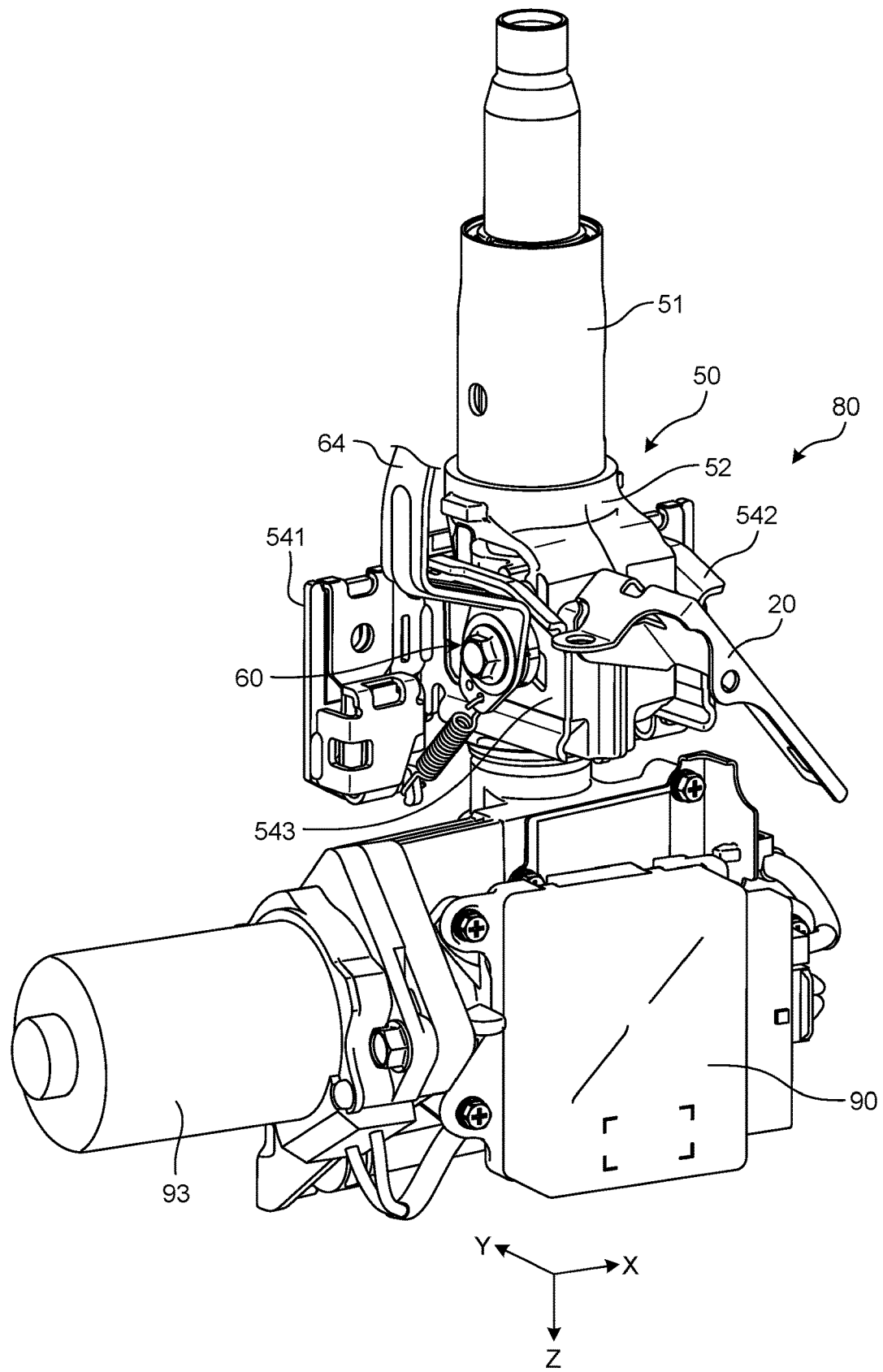
FIG. 5 is a perspective view of the steering apparatus according to the first embodiment.
Figure 6:
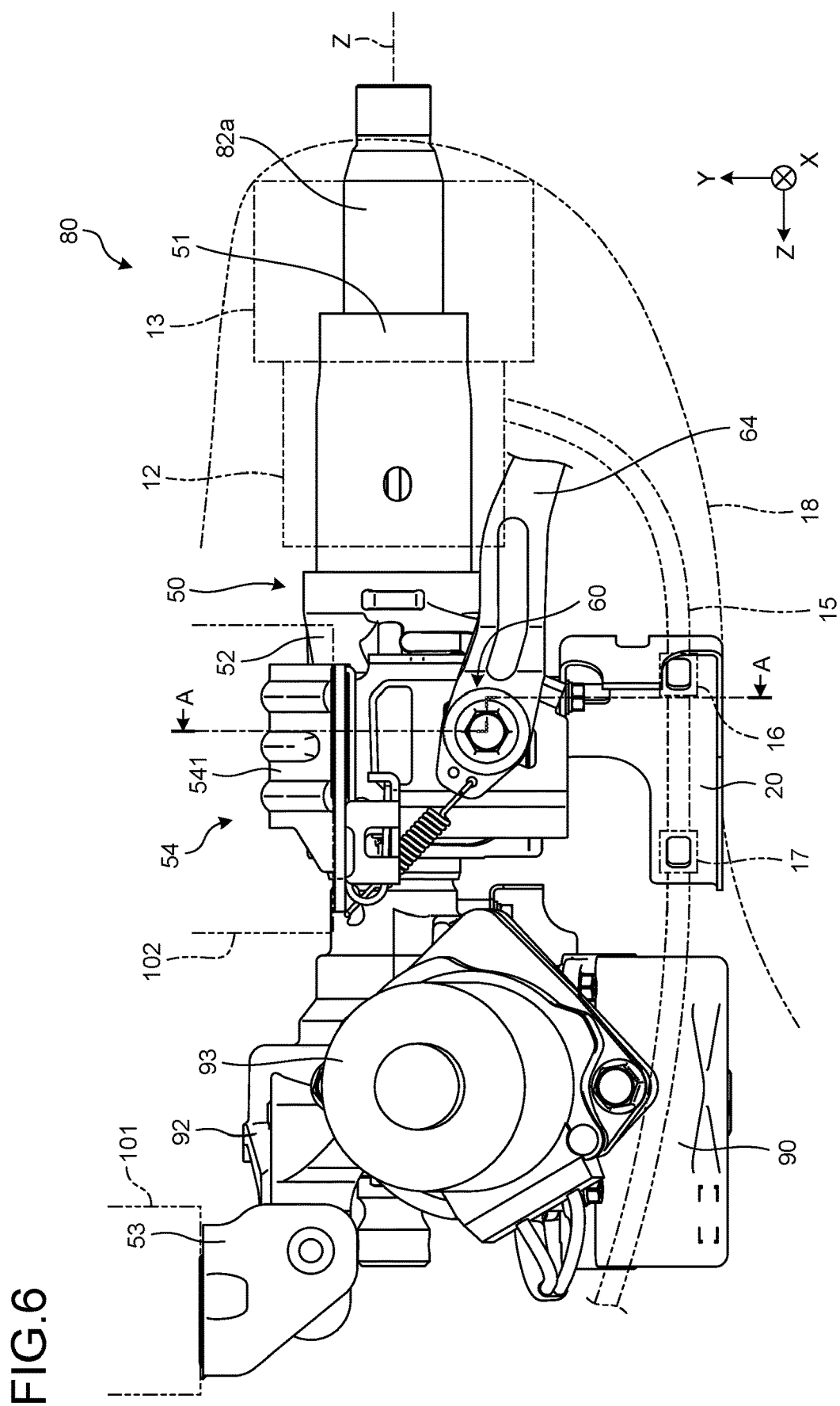
FIG. 6 is a front view of the steering apparatus according to the first embodiment.
Figure 7:
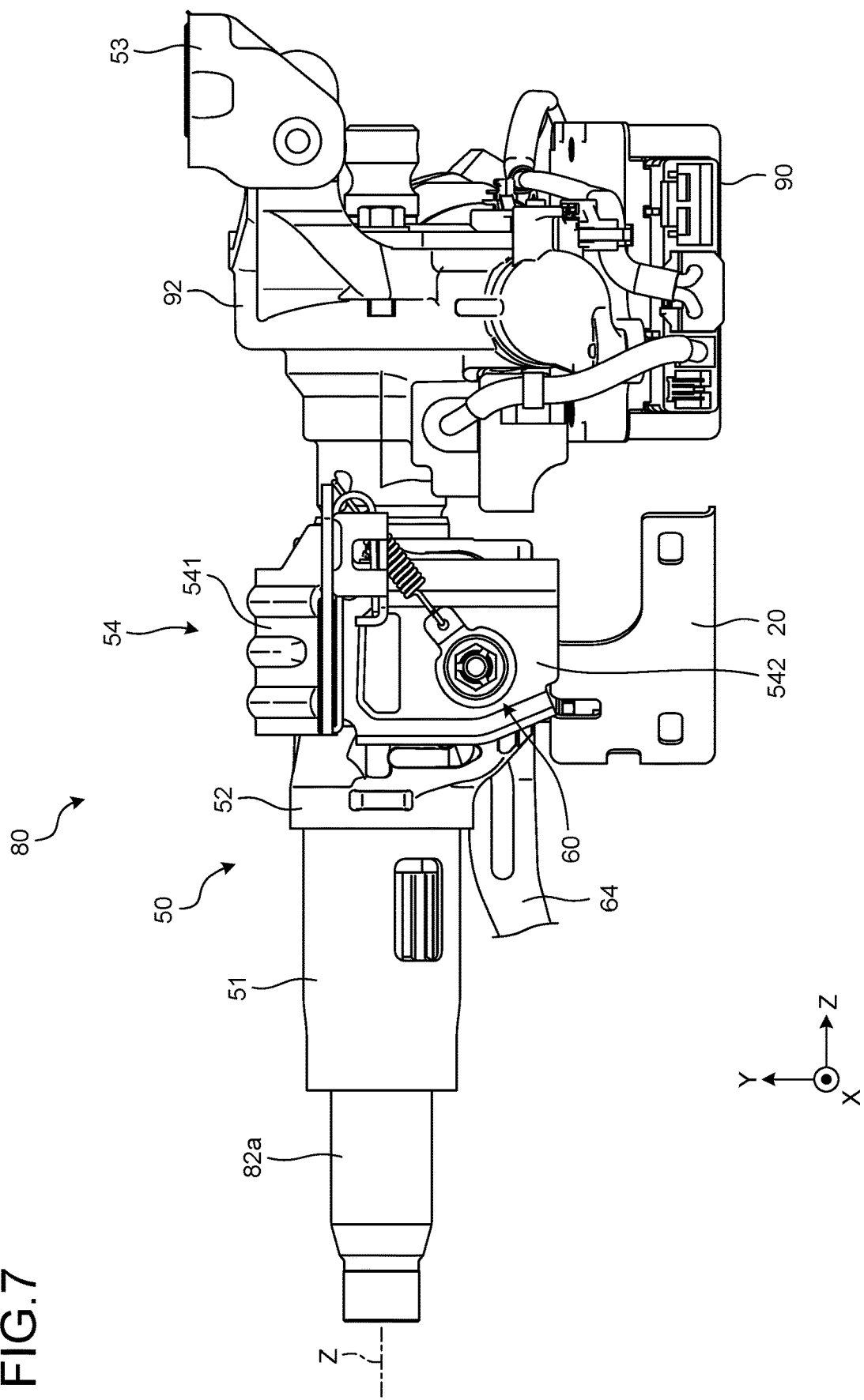
FIG. 7 is a rear view of the steering apparatus according to the first embodiment.
Figure 8:
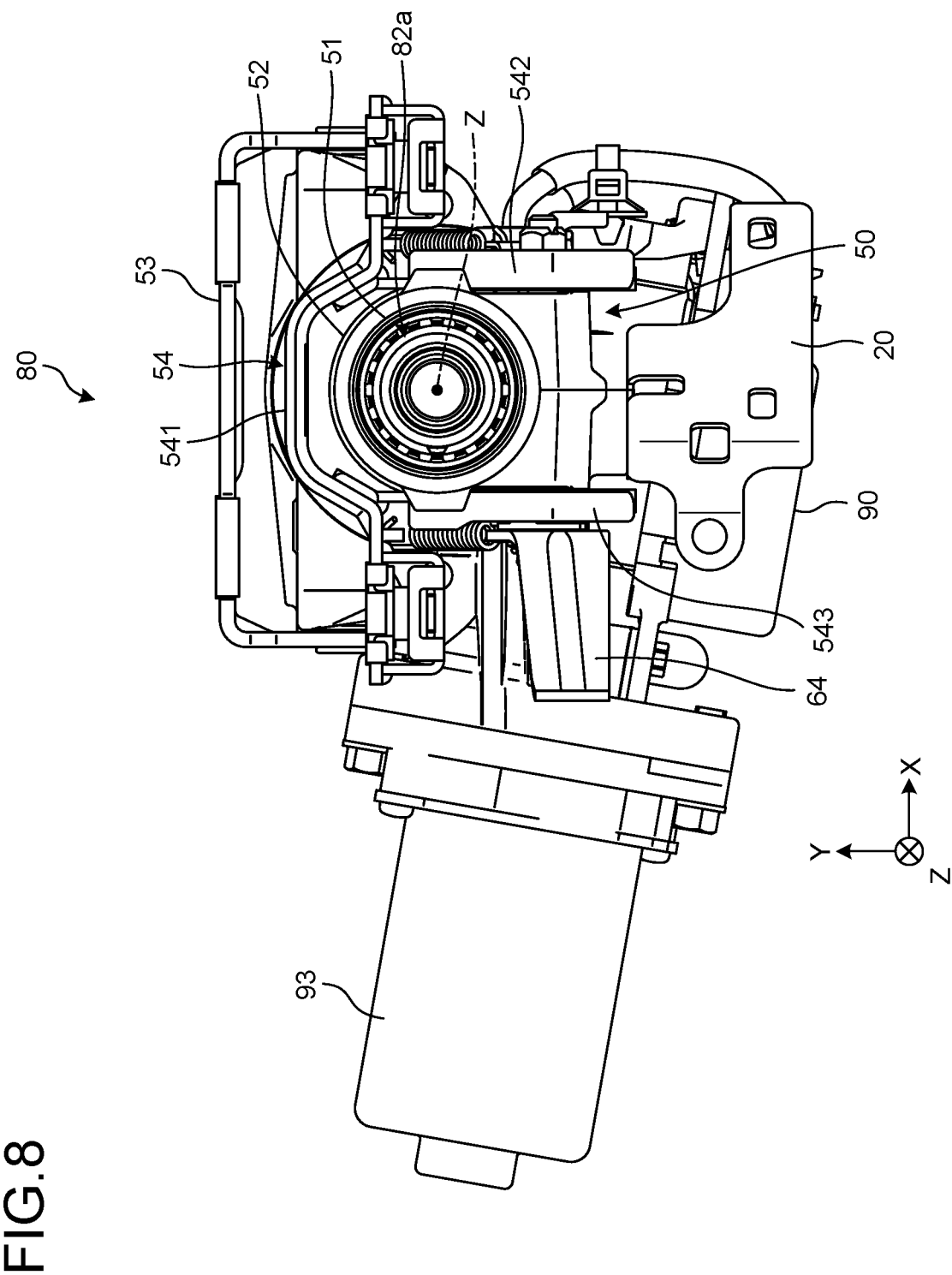
FIG. 8 is a right side view of the steering apparatus according to the first embodiment.
Figure 9:
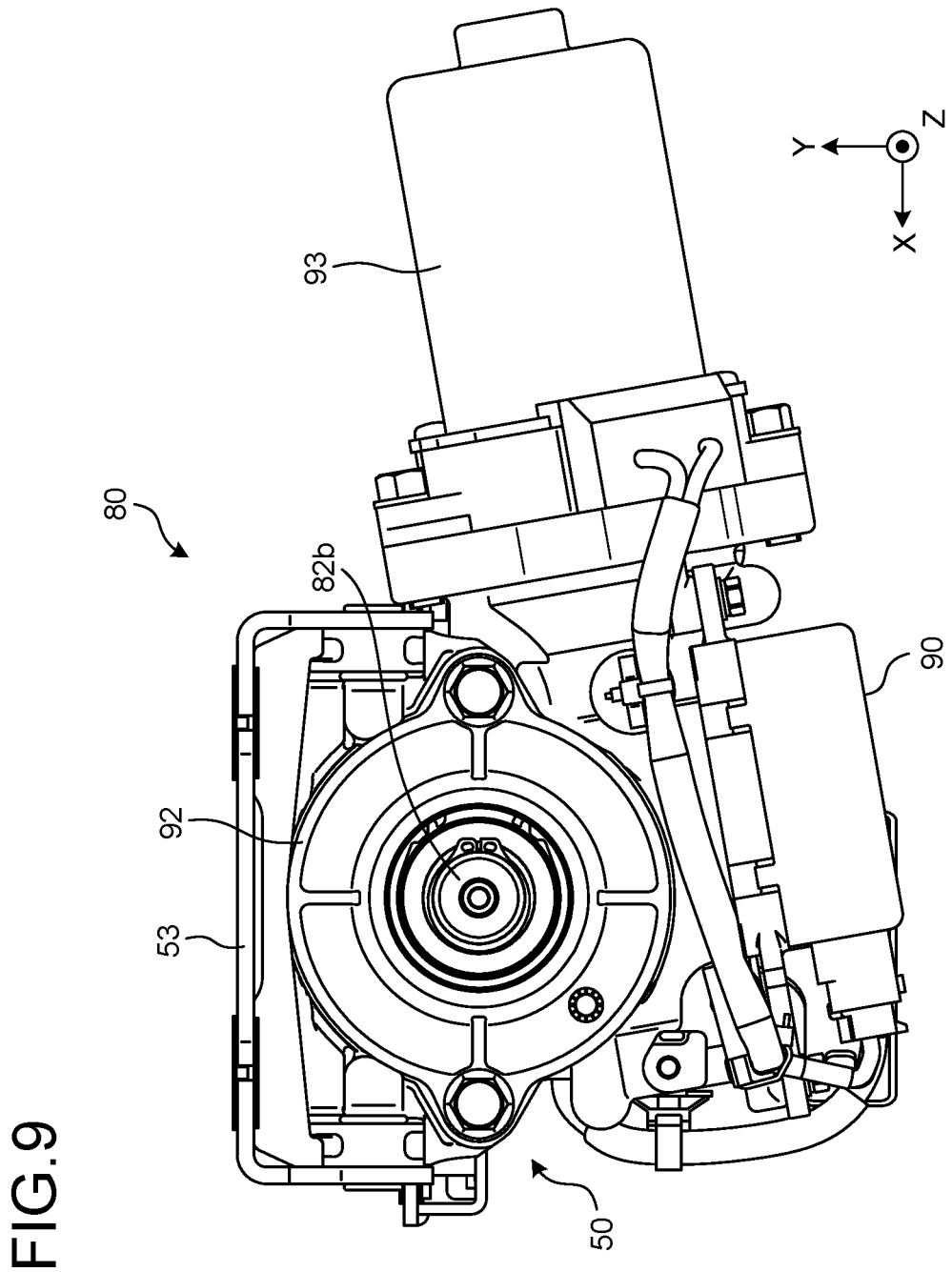
FIG. 9 is a left side view of the steering apparatus according to the first embodiment.
Figure 10:
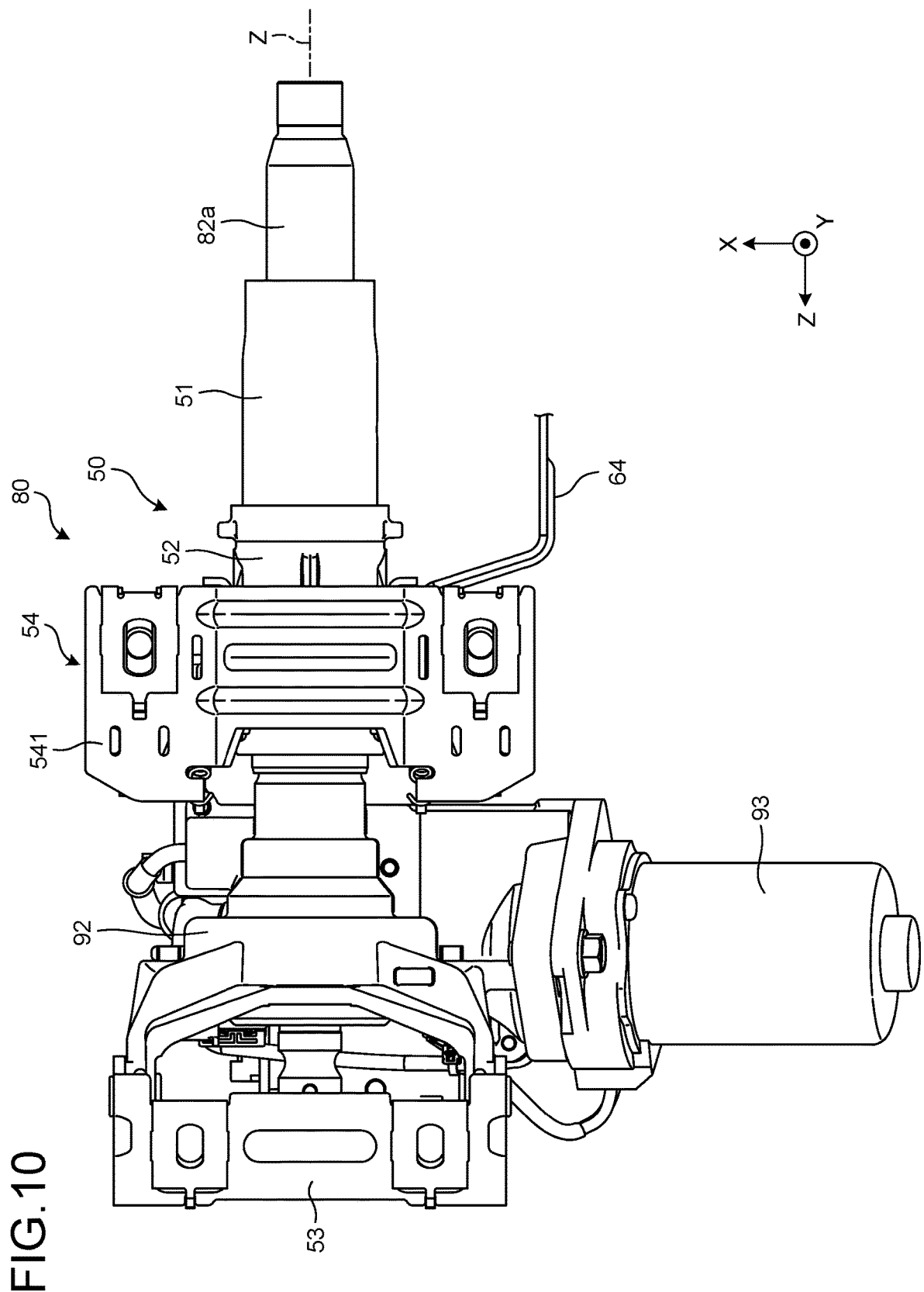
FIG. 10 is a plan view of the steering apparatus according to the first embodiment.
Figure 11:
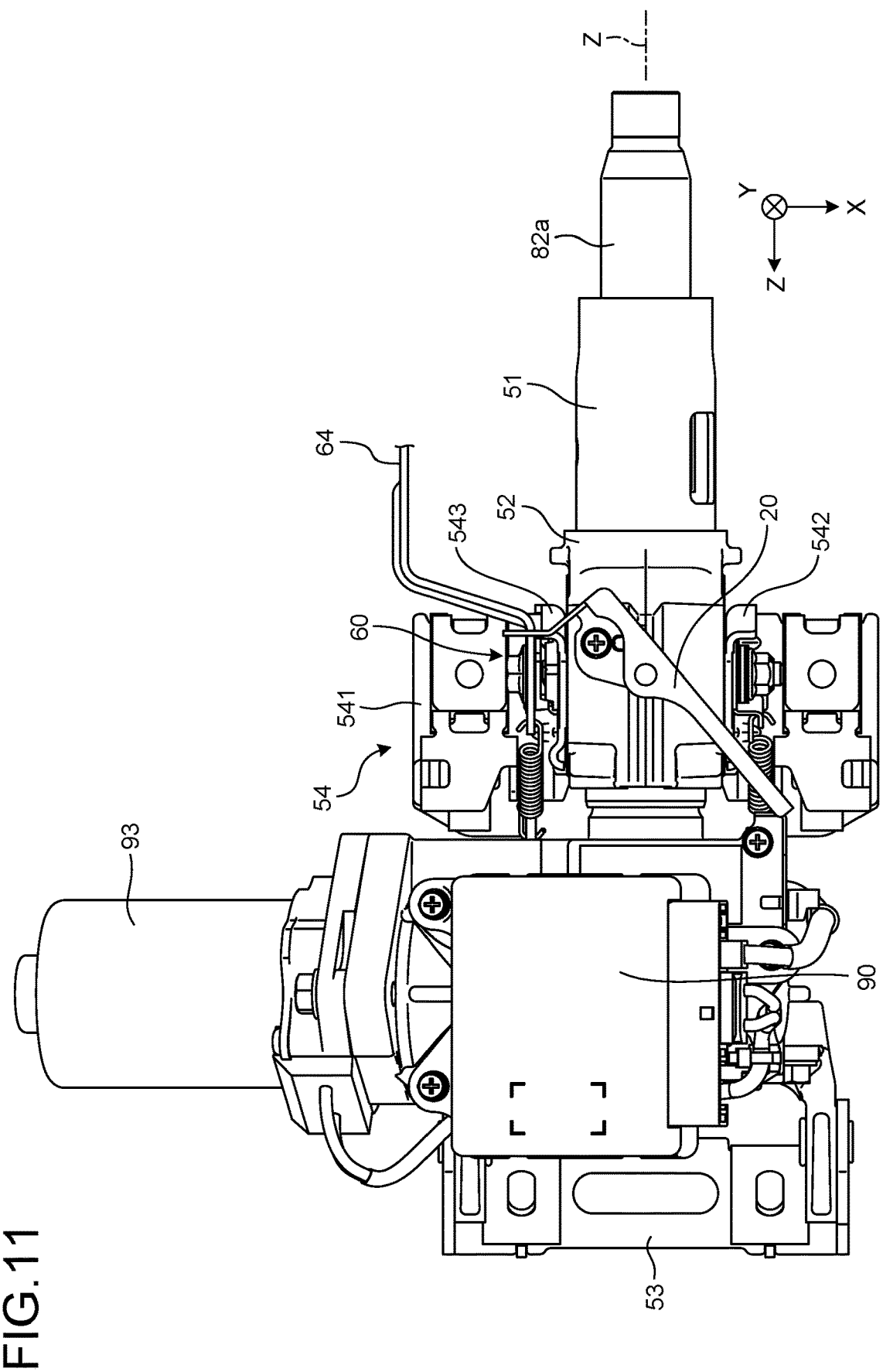
FIG. 11 is a bottom view of the steering apparatus according to the first embodiment.
Figure 12:
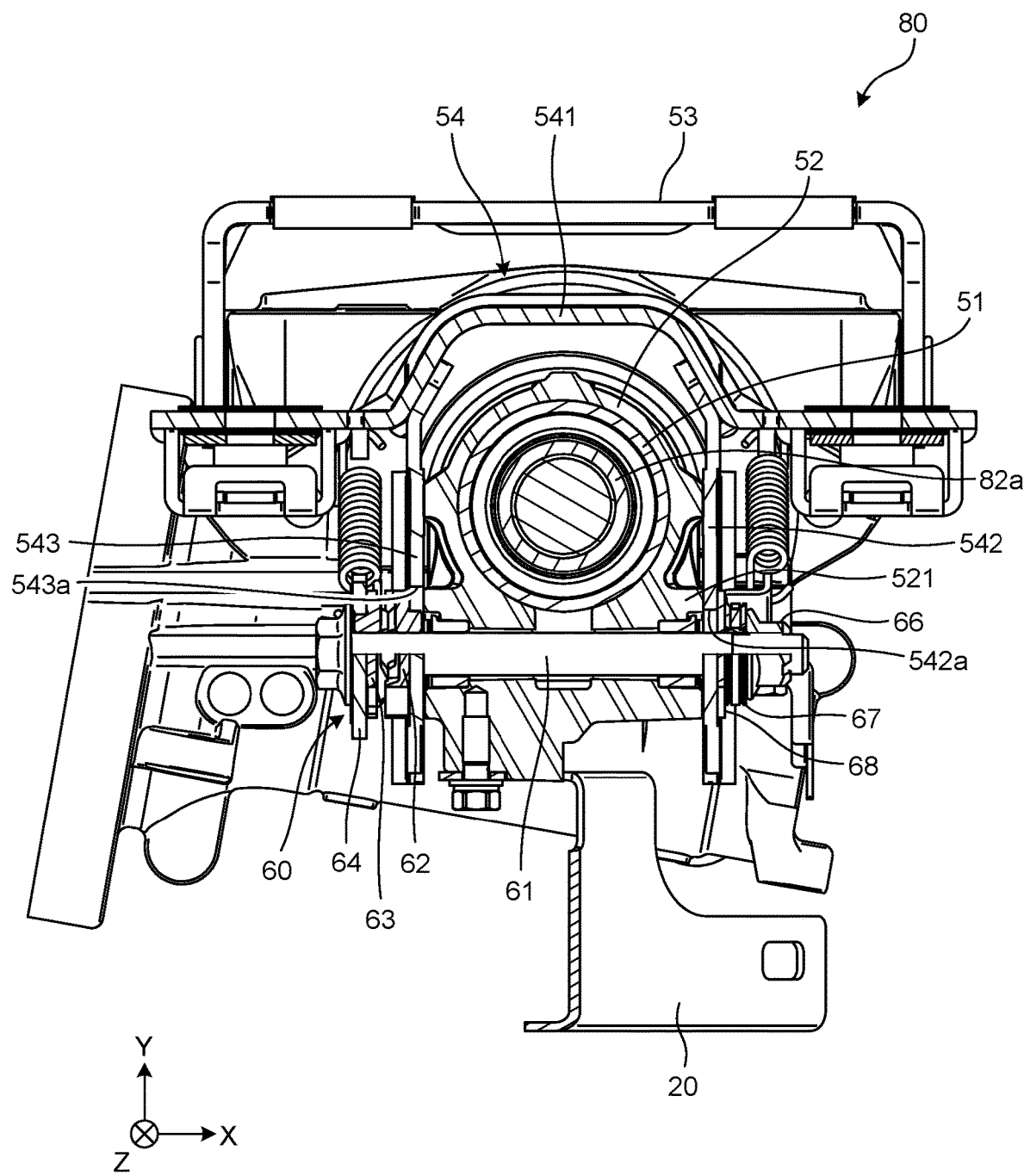
FIG. 12 is a cross-sectional view across A-A in FIG. 6.

FIG. 2 is a perspective view of the steering apparatus according to the first embodiment. FIG. 3 is a perspective view of the steering apparatus according to the first embodiment. FIG. 4 is a perspective view of the steering apparatus according to the first embodiment. FIG. 5 is a perspective view of the steering apparatus according to the first embodiment. FIG. 6 is a front view of the steering apparatus according to the first embodiment. FIG. 7 is a rear view of the steering apparatus according to the first embodiment. FIG. 8 is a right side view of the steering apparatus according to the first embodiment. FIG. 9 is a left side view of the steering apparatus according to the first embodiment. FIG. 10 is a plan view of the steering apparatus according to the first embodiment. FIG. 11 is a bottom view of the steering apparatus according to the first embodiment. FIG. 12 is a cross-sectional view across A-A in FIG. 6.

In the explanation below, XYZ Cartesian coordinates will be used. The X axis is an axis that is in parallel with the left-and-right direction of the vehicle. The Z axis is in parallel with the rotational axis Z. Among the directions in parallel with the Z axis, the direction toward the front side of the vehicle is denoted as +Z direction. Among the directions in parallel with the Y axis, the upward direction with respect to the vehicle is denoted as +Y direction. Facing the +Z direction with +Y direction plotted upwards, the rightward direction is denoted as a +X direction.

As illustrated in FIGS. 2 to 11, the steering apparatus 80 includes a steering column 50. The steering column 50 includes an upper column 51, a lower column 52, a first support member 53, a second support member 54, a fastening mechanism 60, and a bracket 20.

The upper column 51 and the lower column 52 are tubular members. The upper column 51 and the lower column 52 are made with general steel members such as carbon steel tubes for machine structures (what is called STKM materials), for example. The upper column 51 is disposed in −Z direction with respect to the lower column 52. At least a part of the upper column 51 is inserted into the lower column 52. The outer circumferential surface of the upper column 51 is brought into contact with the inner circumferential surface of the lower column 52. The upper column 51 and the lower column 52 rotatably support the steering shaft 82 about the rotational axis Z. The upper column 51 supports the input shaft 82a via a bearing. The lower column 52 supports the output shaft 82b via a bearing.

As illustrated in FIG. 6, the first support member 53 is attached to a body-side member 101 that is fixed to the vehicle body. The first support member 53 rotatably supports the lower column 52 about a rotational axis extending along the X direction. The first support member 53 is also referred to as a pivot bracket. The lower column 52 is movable in the Y direction with the first support member 53 as a fulcrum.

As illustrated in FIG. 6, the second support member 54 is attached to a body-side member 102 that is fixed to the vehicle body. The second support member 54 supports the lower column 52 on the side in the −Z direction with respect to the first support member 53. The second support member 54 includes a top plate 541, a side plate 542, and a side plate 543. The top plate 541 is fixed to the body-side member 102 using fixing members such as bolts. The side plate 542 and the side plate 543 are disposed in such a manner that the lower column 52 is sandwiched thereby. The side plate 542 and the side plate 543 together fasten the lower column 52. The side plate 542 has a long hole 542a elongated in the Y direction. The side plate 543 has a long hole 543a elongated in the Y direction.

Figure 13:
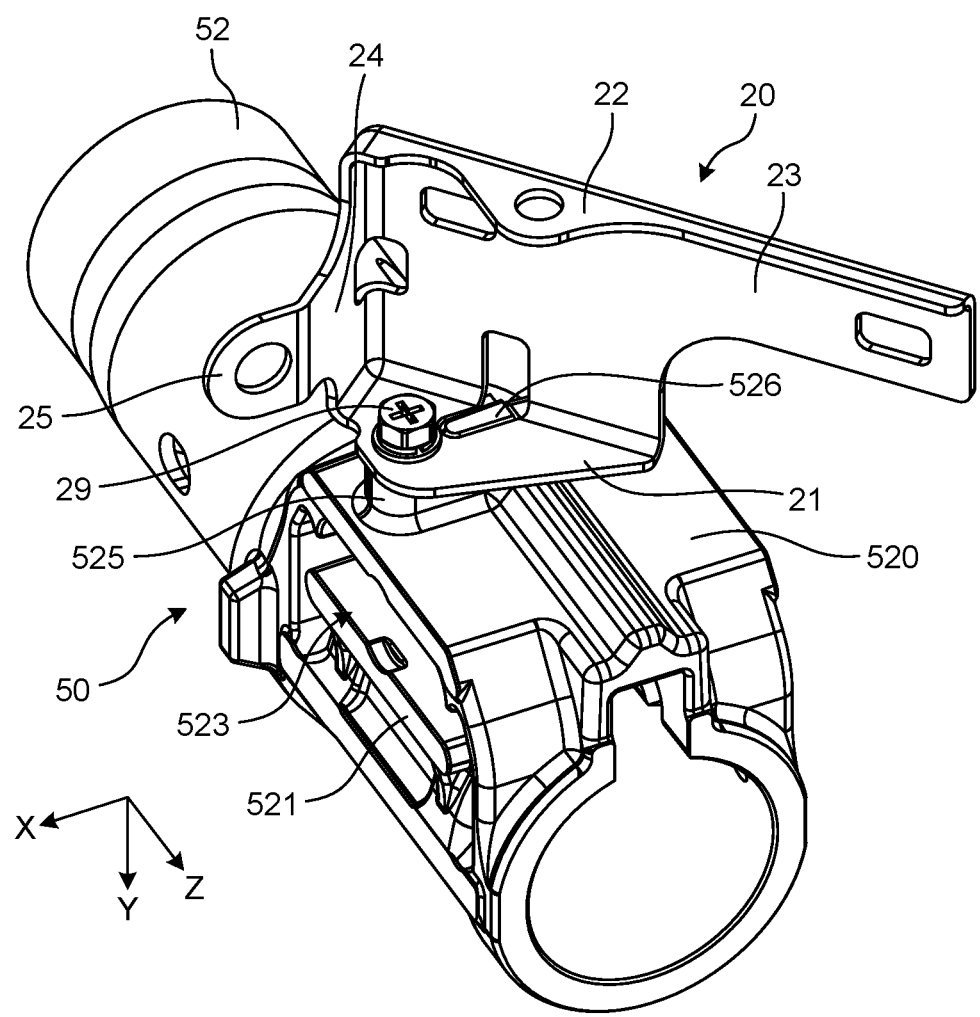
FIG. 13 is a perspective view of a steering column and a bracket according to the first embodiment.
Figure 14:
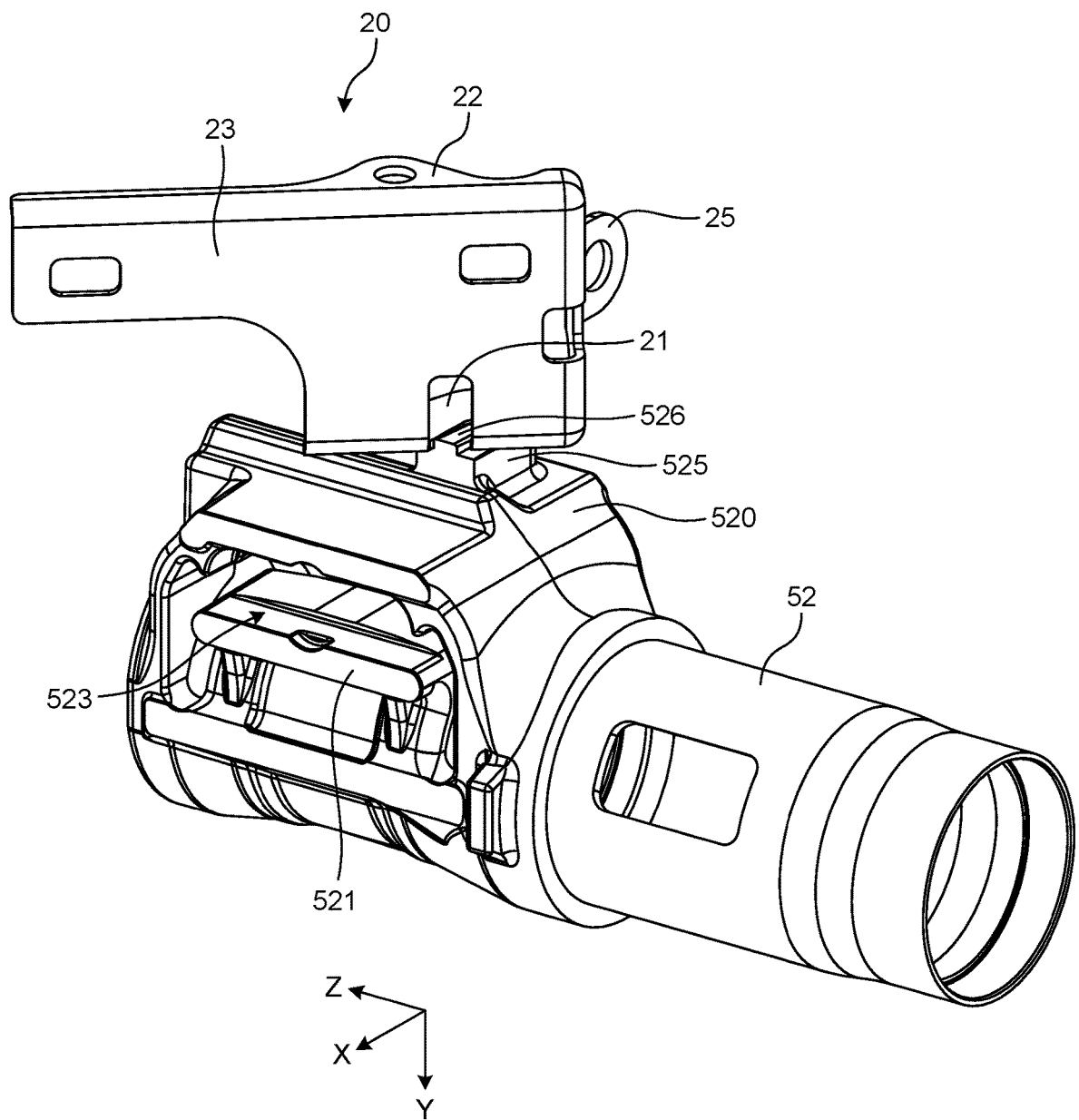
FIG. 14 is a perspective view of the steering column and the bracket according to the first embodiment.
Figure 15:
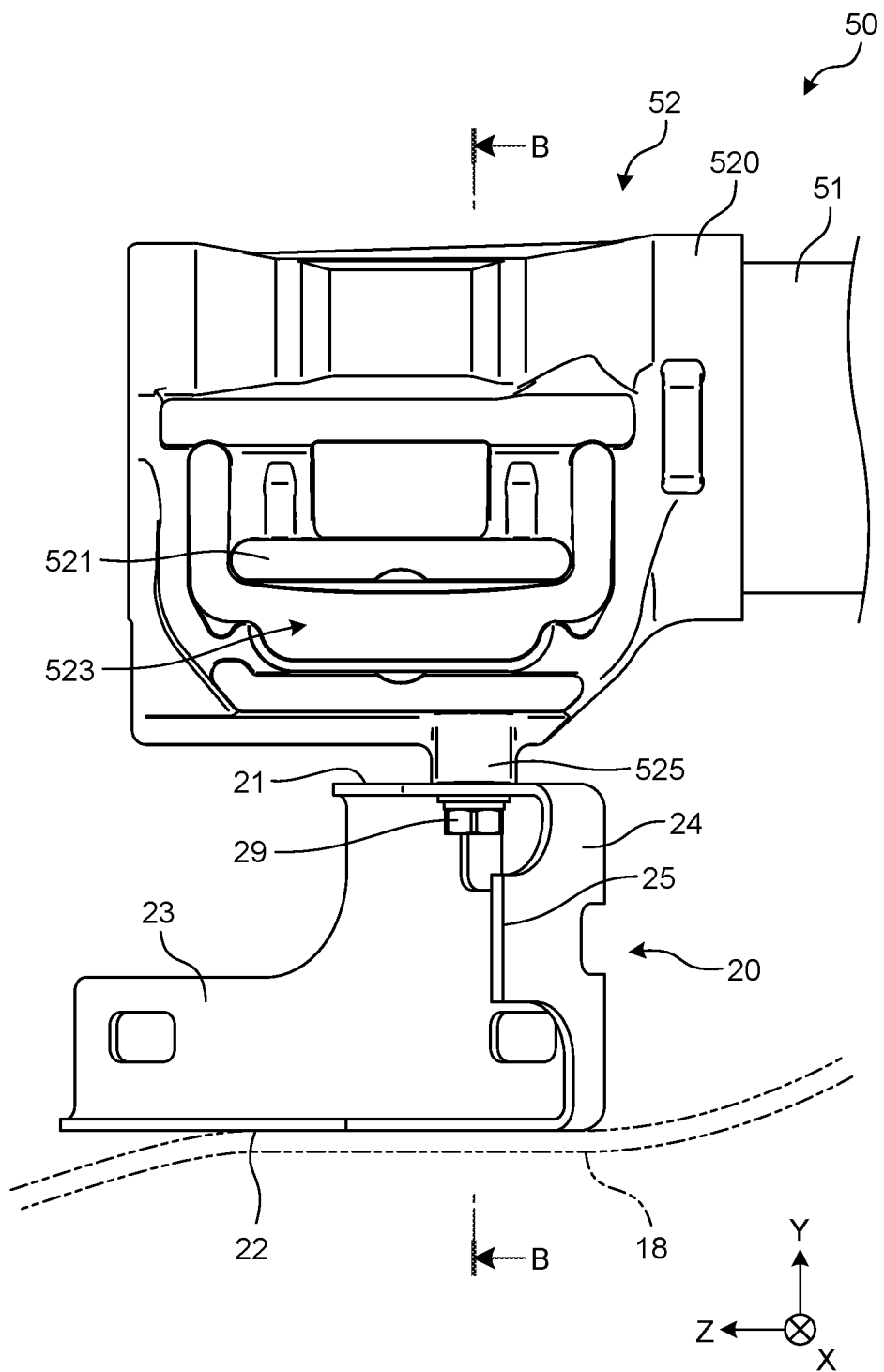
FIG. 15 is a front view of the steering column and the bracket according to the first embodiment.
Figure 16:
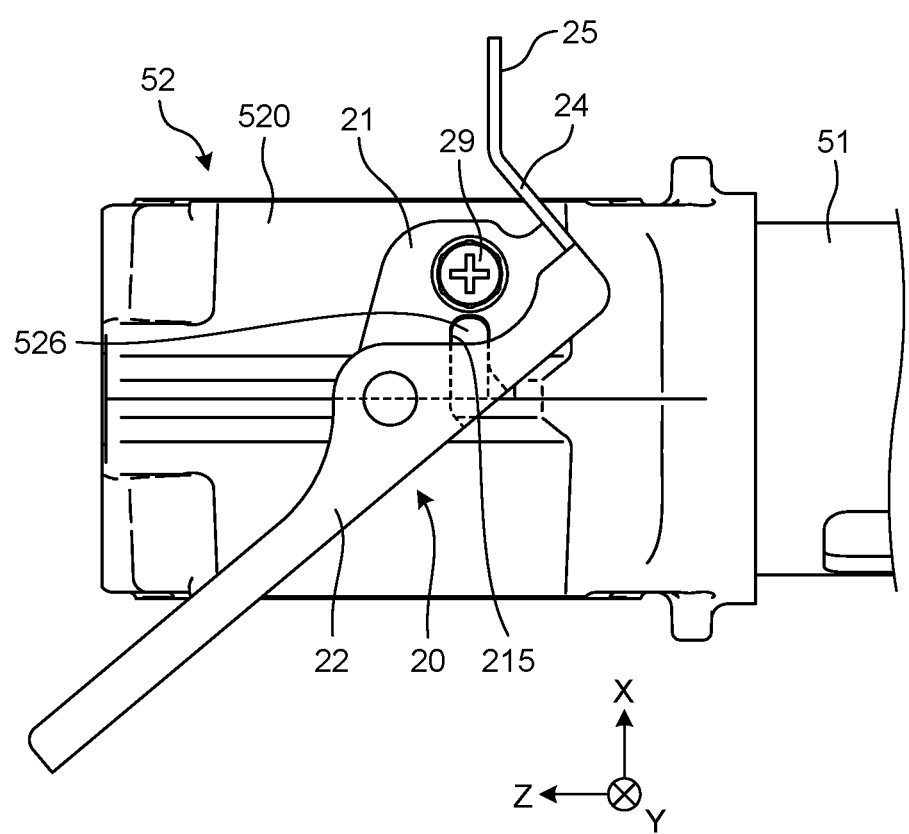
FIG. 16 is a bottom view of the steering column the bracket according to the first embodiment.
Figure 17:
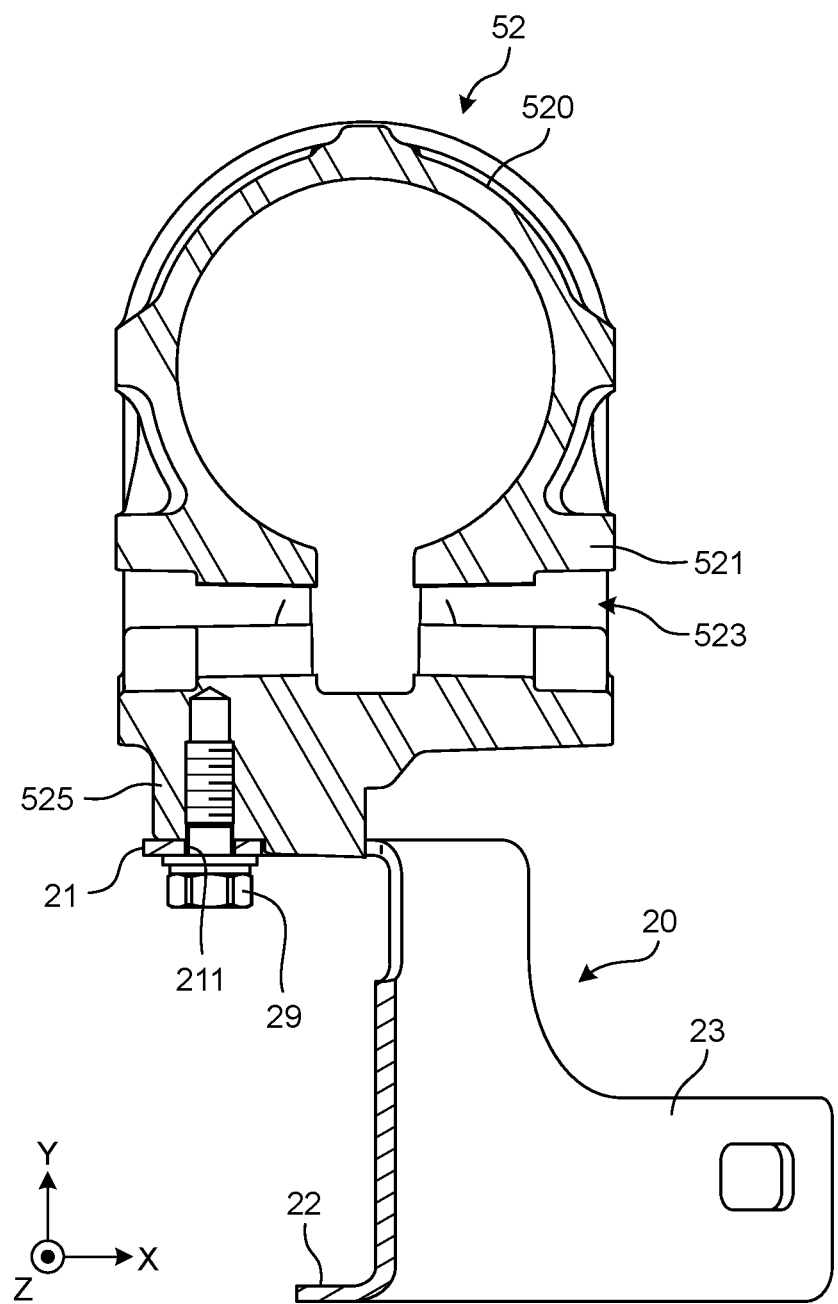
FIG. 17 is a cross-sectional view across B-B in FIG. 15.

FIGS. 13 and 14 are perspective views of the steering column and the bracket according to the first embodiment. FIG. 15 is a front view of the steering column and the bracket according to the first embodiment. FIG. 16 is a bottom view of the steering column and the bracket according to the first embodiment. FIG. 17 is a cross-sectional view across B-B in FIG. 15.

As illustrated in FIG. 13, the lower column 52 includes a main body 520, two movable parts 521, two slits 523, a seat 525, and a protrusion 526. The main body 520 has a tubular shape, and is in contact with the side plate 542 and the side plate 543. The movable parts 521 are integrated with the main body 520. The movable parts 521 are surrounded by the slits 523, and are moveable in X direction. The slits 523 are cutouts provided to the main body 520. The slits 523 have a substantially U shape in a Y-Z plan view, as illustrated in FIG. 15. One of the pairs of the movable part 521 and the slit 523 faces the side plate 542. The other pair of the movable part 521 and the slit 523 faces the side plate 543. The seat 525 is disposed on the bottom surface of the main body 520. The seat 525 protrudes in the −Y direction from the bottom surface of the main body 520. The protrusion 526 is disposed on the surface of the seat 525 on the side in the −Y direction. The longitudinal direction of the protrusion 526 follows the X axis.

The fastening mechanism 60 is a device for adjusting the force by which the side plate 542 and the side plate 543 fasten the lower column 52. As illustrated in FIG. 12, the fastening mechanism 60 includes a rod 61, a stationary cam 62, a rotating cam 63, a lever 64, a nut 66, a thrust bearing 67, and a spacer 68.

As illustrated in FIG. 12, the rod 61 is passed through the slits 523. The stationary cam 62 is a member that has a substantially disk-like shape fitted into the long hole 543*a* on the side plate 543. The rod 61 is passed through the stationary cam 62. The stationary cam 62 does not co-rotate with the rod 61. The rotating cam 63 is a member having a substantially disk-like shape positioned adjacently to the stationary cam 62. The lever 64 is connected to the rod 61 and the rotating cam 63. The lever 64 extends into the cabin. As the lever 64 is rotated, the rod 61 and the rotating cam 63 are rotated, but the stationary cam 62 is not rotated. For example, an inclined surface is provided to the surface of the stationary cam 62 on the side facing the rotating cam 63. The distance between the rotating cam 63 and the stationary cam 62 changes as the rotating cam 63 climbs over the inclined surface of the stationary cam 62.

The nut 66 is attached to a tip of the rod 61. The spacer 68 is disposed in a manner facing the long hole 542*a* on the side plate 542. The thrust bearing 67 is disposed between the nut 66 and the spacer 68. The rod 61 does not move in the axial direction, but is rotated in association with a rotation of the lever 64.

When the lever 64 is rotated in a manner increasing the distance between the rotating cam 63 and the stationary cam 62, the stationary cam 62 is pushed against the side plate 543, and the spacer 68 is pushed against the side plate 542 at the same time. The friction between the stationary cam 62 and the side plate 543 and the friction between the spacer 68 and the side plate 542 are increased. As a result, the positions of the upper column 51 and the lower column 52 in the Y direction are fixed. As the movable parts 521 are pushed by the side plate 542 and the side plate 543, the friction between the upper column 51 and the lower column 52 is increased. As a result, the position of the upper column 51 with respect to the lower column 52 in the Z direction is fixed. When the lever 64 is rotated in a manner increasing the distance between the rotating cam 63 and the stationary cam 62, the movable parts 521 are moved, but the main body 520 is not moved.

When the lever 64 is rotated in a manner decreasing the distance between the rotating cam 63 and the stationary cam 62, gaps are likely to be formed between the stationary cam 62 and the side plate 543, and between the spacer 68 and the side plate 542. As a result, the friction between the stationary cam 62 and the side plate 543 and the friction between the spacer 68 and the side plate 542 are decreased or eliminated. As a result, the position adjustments of the upper column 51 and the lower column 52 in the Y direction become possible. Furthermore, because the movable parts 521 are no longer pushed by the side plate 542 and the side plate 543, the friction between the upper column 51 and the lower column 52 is decreased or eliminated. As a result, the position adjustment of the upper column 51 with respect to the lower column 52 in the Z direction becomes possible.

As illustrated in FIG. 6, a key lock 12 and a switch 13 are attached to the upper column 51. The key lock 12 is a device for restricting the rotation of the steering wheel 81 to prevent thefts, for example. For example, when the ignition switch 98 is switched OFF, the lock pin of the key lock 12 is actuated. The lock pin moves into the upper column 51 through the hole provided to the upper column 51, and becomes meshed with the steering shaft 82. The switch 13 is a switch for operating the blinker, or a switch for operating the wiper, for example. The key lock 12 and the switch 13 are electrically connected to a controller provided to the vehicle via a wire harness 15. The controller may be the ECU 90, or may be a device different from the ECU 90. The wire harness 15 is supported by a clip 16 and a clip 17. The clip 16 and the clip 17 are attached to the bracket 20.

As illustrated in FIG. 6, a column cover 18 is attached to the steering column 50. The column cover 18 covers the steering column 50. The column cover 18 is a member for making the steering column 50 not visible from the inside of the cabin. The column cover 18 is attached to the bracket 20.

Figure 22:
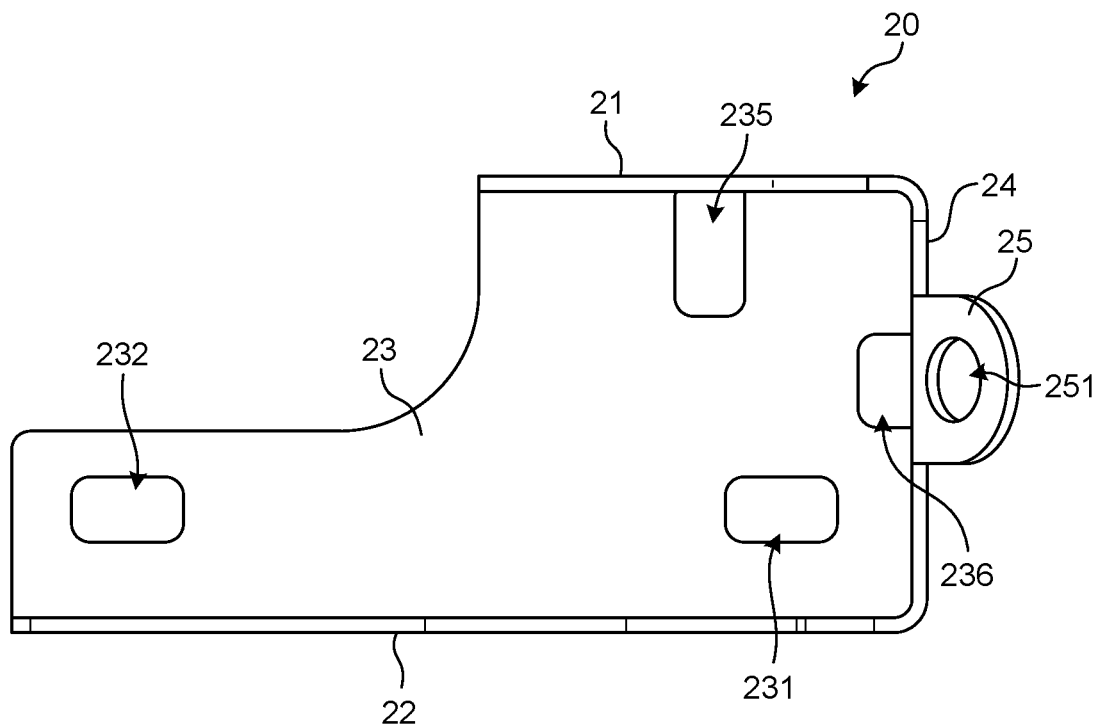
FIG. 22 is a front view of the bracket according to the first embodiment.
Figure 23:
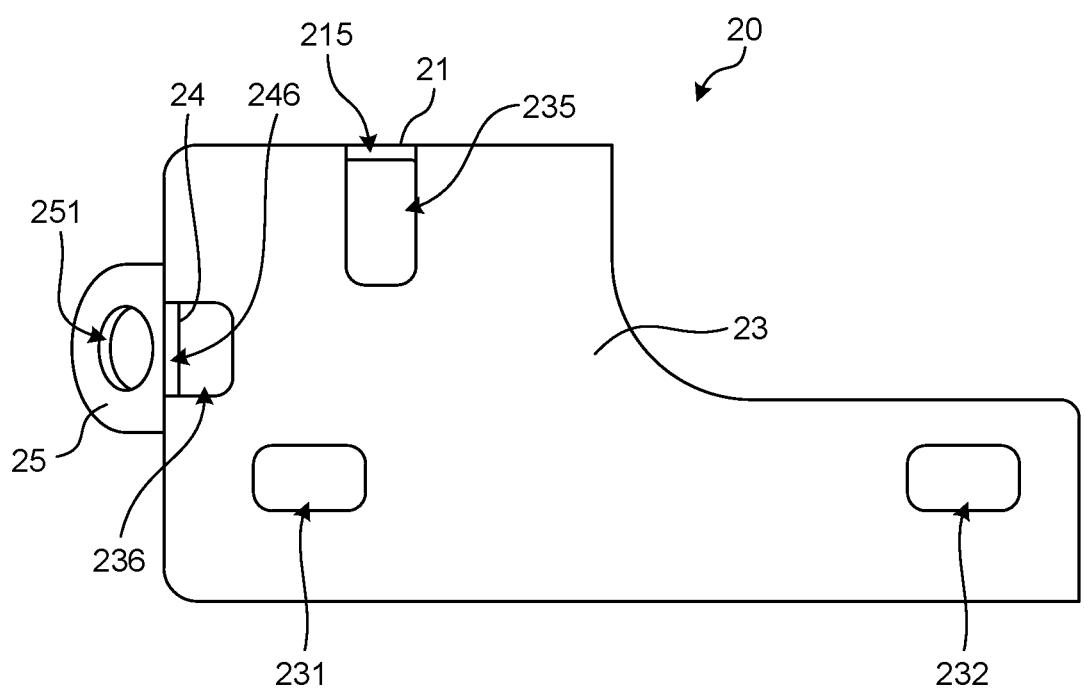
FIG. 23 is a rear view of the bracket according to the first embodiment.
Figure 24:
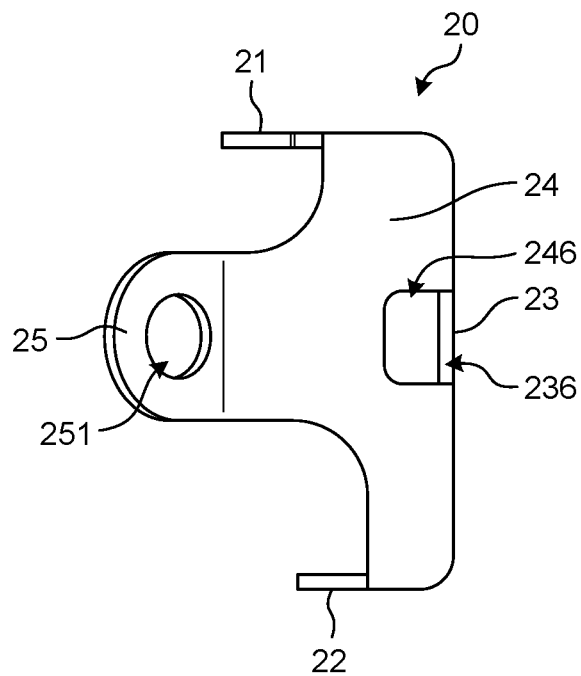
FIG. 24 is a right side view of the bracket according to the first embodiment.

FIGS. 18 to 21 are perspective views of the bracket according to the first embodiment. FIG. 22 is a front view of the bracket according to the first embodiment. FIG. 23 is a rear view of the bracket according to the first embodiment. FIG. 24 is a right side view of the bracket according to the first embodiment.

Figure 25:
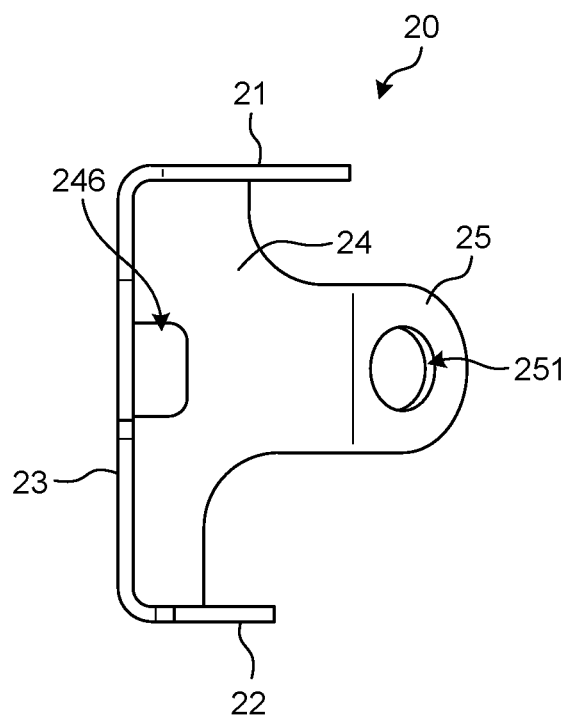
FIG. 25 is a left side view of the bracket according to the first embodiment.
Figure 26:
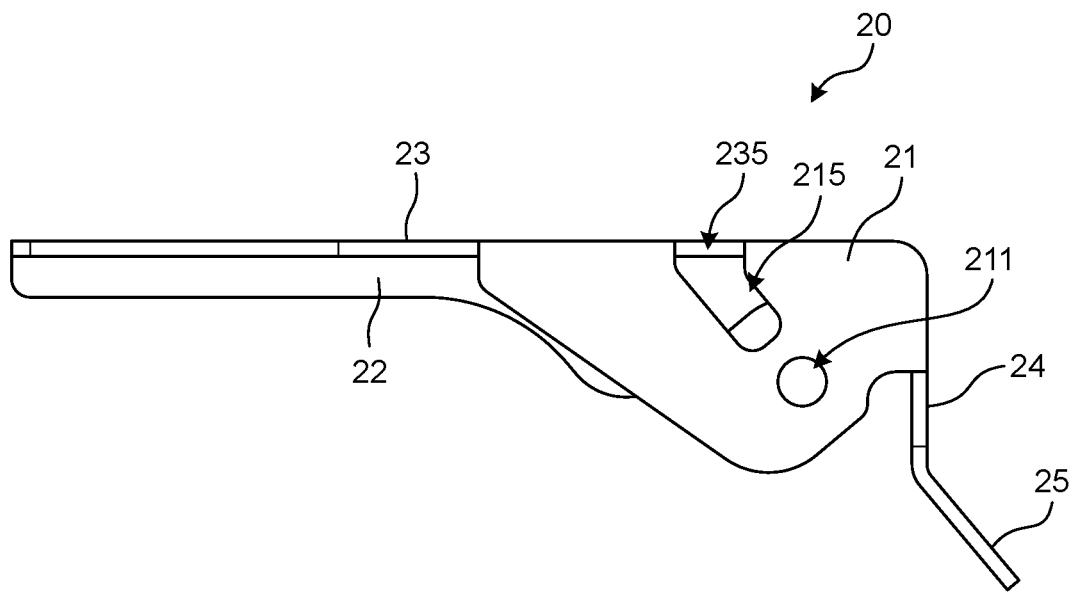
FIG. 26 is a plan view of the bracket according to the first embodiment.
Figure 27:
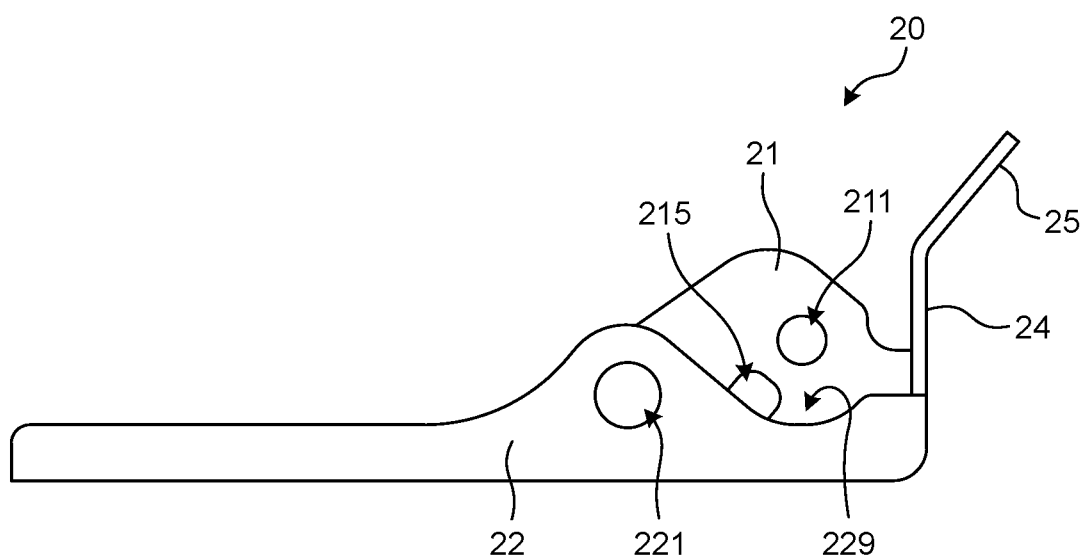
FIG. 27 is a bottom view of the bracket according to the first embodiment.

FIG. 25 is a left side view of the bracket according to the first embodiment. FIG. 26 is a plan view of the bracket according to the first embodiment. FIG. 27 is a bottom view of the bracket according to the first embodiment.

As illustrated in FIG. 6, the bracket 20 is a member for supporting the column cover 18, and is a member for supporting the wire harness 15. As illustrated in FIGS. 18 to 27, the bracket 20 includes a first plate 21, a second plate 22, a third plate 23, a fourth plate 24, and a fifth plate 25.

As illustrated in FIG. 15, the first plate 21 faces the steering column 50. The first plate 21 faces the bottom surface of the main body 520 of the lower column 52.

Figure 18:
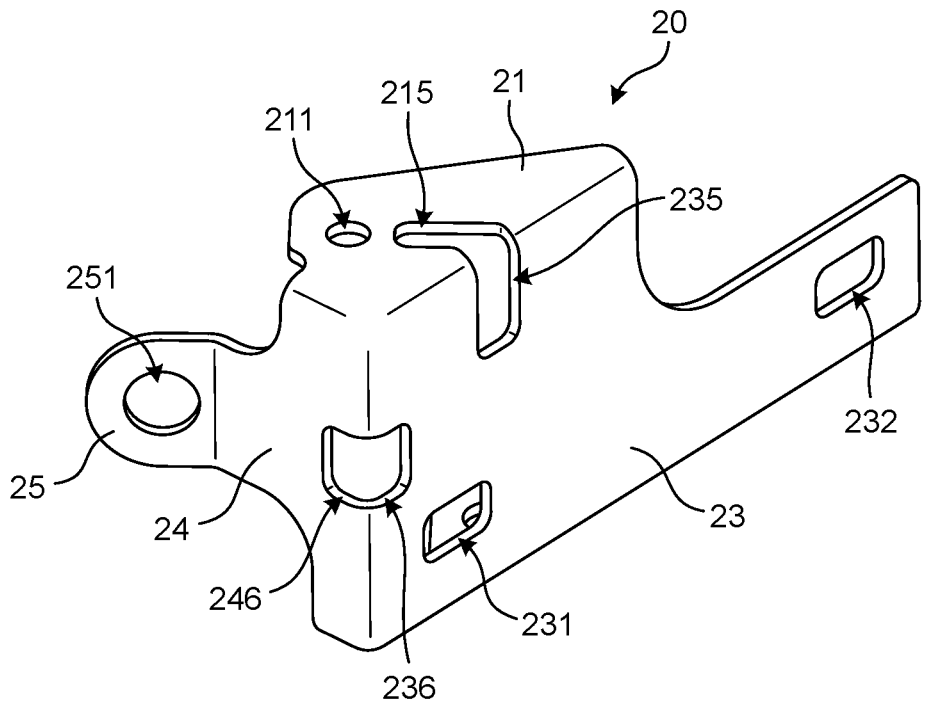
FIG. 18 is a perspective view of the bracket according to the first embodiment.

The first plate 21 is a flat plate. The first plate 21 extends in parallel with the bottom surface of the main body 520. As illustrated in FIG. 13, the width of the first plate 21 in the X direction is greater than the width of the main body 520 (the distance between the side plate 542 and the side plate 543) in the X direction. With this configuration, when the upper column 51 and the lower column 52 move in the Y direction, the first plate 21 does not interfere with the side plate 542 and the side plate 543. As illustrated in FIG. 18, the first plate 21 has a first attachment hole 211 and a positioning hole 215. As illustrated in FIG. 17, an attaching member 29 is passed through the first attachment hole 211. The attaching member 29 is a member for attaching the first plate 21 to the lower column 52. The attaching member 29 is a bolt, for example. The positioning hole 215 is a long hole. As illustrated in FIG. 16, the protrusion 526 of the lower column 52 is fitted into the positioning hole 215. With this configuration, the rotation of the first plate 21 is restricted.

Figure 19:
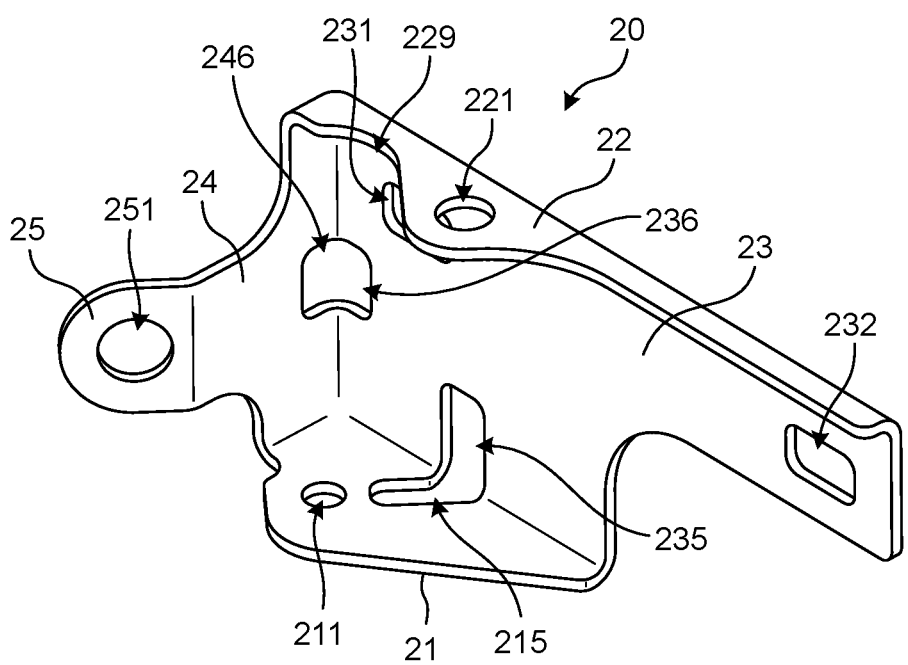
FIG. 19 is a perspective view of the bracket according to the first embodiment.
Figure 20:
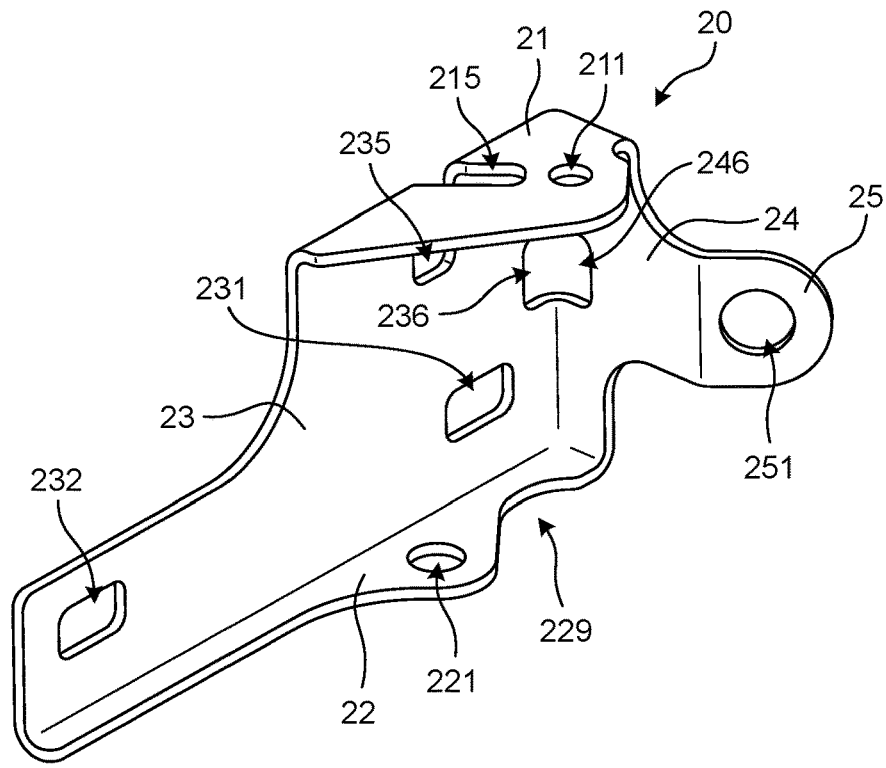
FIG. 20 is a perspective view of the bracket according to the first embodiment.
Figure 21:
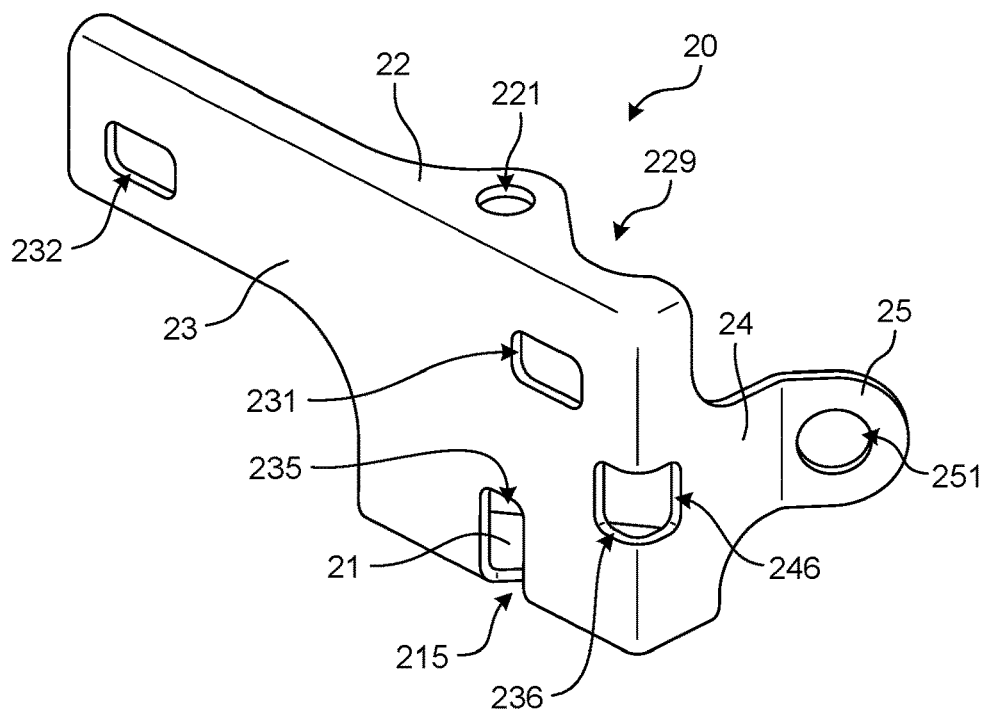
FIG. 21 is a perspective view of the bracket according to the first embodiment.

As illustrated in FIG. 15, the second plate 22 faces the column cover 18. The second plate 22 is a flat plate. As illustrated in FIG. 19, the second plate 22 extends in parallel with the first plate 21. The second plate 22 has a second attachment hole 221 and a cutout 229. The attaching member for attaching the column cover 18 to the bracket 20 is passed through the second attachment hole 221. The attaching member is a bolt, for example. As illustrated in FIG. 27, the second plate 22 is offset from the first attachment hole 211 in a plan view perpendicular to the passing direction through the first attachment hole 211 (in a plan view perpendicular to the first plate 21). In other words, the cutout 229 is provided at a position overlapping with the first attachment hole 211 in a plan view perpendicular to the passing direction through the first attachment hole 211. With this configuration, it is possible to insert the attaching member 29 into the first attachment hole 211 from the side of the second plate 22.

As illustrated in FIG. 19, the third plate 23 connects the first plate 21 and the second plate 22. The third plate 23 is a flat plate. The third plate 23 intersects with the first plate 21 and the second plate 22. For example, the third plate 23 intersects perpendicularly with the first plate 21 and the second plate 22. The third plate 23 has a clip hole 231, a clip hole 232, a positioning hole 235, and a first end hole 236. The clip 16 (see FIG. 6) for supporting the wire harness 15 is attached to the clip hole 231. The clip 17 for supporting the wire harness 15 is attached to the clip hole 232 (see FIG. 6). For example, if a force is applied to the wire harness 15 attached to the third plate 23, there is a chance that the bracket 20 goes through a deformation. Therefore, the bracket 20 is required to be highly rigid. The positioning hole 235 is disposed at the end on the side of the first plate 21. The positioning hole 235 is continuous with the positioning hole 215 provided to the first plate 21. With this configuration, the protrusion 526 of the lower column 52 can be inserted into the positioning hole 215 easily. The first end hole 236 is disposed at the end on the side of the fourth plate 24.

As illustrated in FIG. 19, the fourth plate 24 is connected to the first plate 21, the second plate 22, and the third plate 23. The fourth plate 24 is a flat plate. The fourth plate 24 intersects with the first plate 21, the second plate 22, and the third plate 23. For example, the fourth plate 24 intersects perpendicularly with the first plate 21, the second plate 22, and the third plate 23. The fourth plate 24 has a second end hole 246. The second end hole 246 is disposed at an end on the side of the third plate 23. The second end hole 246 is connected with the first end hole 236 on the third plate 23.

As illustrated in FIG. 19, the fifth plate 25 is connected to the fourth plate 24. The fifth plate 25 is a flat plate. The fifth plate 25 intersects with the fourth plate 24. For example, the angle formed by the fifth plate 25 and the fourth plate 24 is an obtuse angle. As illustrated in FIG. 16, the fifth plate 25 intersects perpendicularly with the Z axis. The fifth plate 25 has an attaching portion 251. The attaching portion 251 is a hole.

The attaching portion 251 of the fifth plate 25 is used in suspending the steering apparatus 80, for example. When the steering apparatus 80 is to be attached to the vehicle, the steering apparatus 80 is suspended to improve the easiness of the task. For example, the steering apparatus 80 is suspended in such a manner that the upper column 51 is positioned above the lower column 52 in the vertical direction. With the steering apparatus 80 suspended, the first support member 53 and the second support member 54 are fixed to the vehicle.

A jig for suspending the steering apparatus 80 is attached to the attaching portion 251 of the fifth plate 25. The jig is a hook of hoisting equipment (hoist), for example. When the steering apparatus 80 is suspended on the jig, a load is imposed on the bracket 20. A stress is likely to be generated in the portion where the fourth plate 24 is connected with the first plate 21. Therefore, there is a chance for the bracket 20 going through a deformation. By contrast, the bracket 20 according to the first embodiment includes the first plate 21, the second plate 22, the third plate 23, and the fourth plate 24. With the fourth plate 24 intersecting with the first plate 21, the second plate 22, and the third plate 23, the rigidity of the bracket 20 is increased. Therefore, even when a load is imposed on the fifth plate 25, a deformation of the bracket 20 is suppressed.

The bracket 20 is manufactured by plastically deforming one plate, for example. The thickness of the one plate is approximately 2.0 mm or so, for example. The bracket 20 is manufactured by deep drawing, for example. With the second end hole 246 being connected with the first end hole 236, formability in the deep drawing is improved. The precision of the shape of the bracket 20 is improved. For example, the flatness of the third plate 23 and the fourth plate 24 is improved. With the positioning hole 235 being connected with the positioning hole 215, formability in the deep drawing is improved. The precision of the shape of the bracket 20 is improved. For example, the flatness of the first plate 21 and the third plate 23 is improved. The positioning hole 215 and the positioning hole 235 serve as holes for both positioning the bracket 20 and improving the formability in the deep drawing.

It is not necessarily need for the bracket 20 to be manufactured by deep drawing. The method for manufacturing the bracket 20 is not limited to a particular method. The bracket 20 may be manufactured by connecting one or more plates by welding, for example. The shape of the bracket 20 is not limited to the shape described above. The angles formed by the fourth plate 24 with the first plate 21, the second plate 22, and the third plate 23 do not need to be 90 degrees, and may be an acute angle or an obtuse angle. The first plate 21, the second plate 22, the third plate 23, the fourth plate 24, and the fifth plate 25 do not need to be flat plates, and may have a curved surface, for example.

The attaching portion 251 of the fifth plate 25 does not necessarily need to be a hole. The attaching portion 251 of the fifth plate 25 may be a hook, for example. Furthermore, the bracket 20 does not necessarily need to be provided with the fifth plate 25.

The first plate 21 does not necessarily need to be provided with the positioning hole 215. For example, the steering column 50 may be provided with a recess, and the first plate 21 may be provided with a protrusion to be fitted into the recess provided to the steering column 50. In other words, one of the steering column 50 and the first plate 21 may be provided with a recess, and the other one of the steering column 50 and the first plate 21 may be provided with a protrusion that is fitted into the recess.

As explained above, the bracket 20 includes the first plate 21 facing the steering column 50, the second plate 22 facing the column cover 18 for covering the steering column 50, the third plate 23 connecting the first plate 21 and the second plate 22, and the fourth plate 24 intersecting with the first plate 21 and the third plate 23.

With the fourth plate 24 intersecting with the first plate 21 and the third plate 23, the rigidity of the bracket 20 is increased. With this configuration, even when member other than the column cover 18 (such as the wire harness 15 or jig) is attached to the bracket 20, a deformation of the bracket 20 is suppressed. Therefore, the bracket 20 can suppress a displacement of the position where the column cover 18 is attached.

In the bracket 20, the fourth plate 24 intersects with the first plate 21, the second plate 22, and the third plate 23. With this configuration, the rigidity of the bracket 20 is further increased. Therefore, the bracket 20 can suppress a displacement of the position where the column cover 18 is attached.

In the bracket 20, the third plate 23 has the first end hole 236 disposed at the end on the side of the fourth plate 24. The fourth plate 24 has the second end hole 246 disposed at the end on the side of the third plate 23. The second end hole 246 is connected with the first end hole 236. With this configuration, when the bracket 20 is manufactured by plastically deforming one plate, formability of the bracket 20 can be improved. The bracket 20 can be manufactured easily, and the precision of the shape can be improved.

In the bracket 20, the first plate 21 has the first attachment hole 211 through which the attaching member 29 for attaching the first plate 21 to the steering column 50 is passed. The second plate 22 is offset from the first attachment hole 211 in a plan view perpendicular to the passing direction through the first attachment hole 211. With this configuration, it is possible to insert the attaching member 29 into the first attachment hole 211 from the side of the second plate 22. The bracket 20 can improve the easiness of the task of attaching the bracket 20 to the steering column 50.

In the bracket 20, the third plate 23 has clip holes (the clip hole 231, the clip hole 232) where clips (the clip 16 or the clip 17) for supporting the wire harness 15 are attached. With this configuration, the bracket 20 can improve the easiness of the task of attaching the wire harness 15.

The steering apparatus 80 includes the bracket 20 and the steering column 50. With this configuration, the steering apparatus 80 can suppress a displacement of the position where the column cover 18 is attached.

The steering apparatus 80 has a recess (for example, the positioning hole 215) provided to one of the steering column 50 and the first plate 21, and the protrusion 526 provided to one of the steering column 50 and the first plate 21, and fitted into the recess. With this configuration, the bracket 20 is positioned by the recess and the protrusion 526. As long as there is at least one attaching member 29, it is possible to attach the bracket 20 to the steering column 50 and to position the bracket 20. The steering apparatus 80 can improve the easiness of the task of attaching the bracket 20.

In the steering apparatus 80, the bracket 20 is disposed under the steering column 50 (in the −Y direction). With this configuration, it is possible to attach the column cover 18 to the bracket 20 from the opposite side of the vehicle body, with respect to the steering column 50. The steering apparatus 80 can improve the easiness of the task of attaching the column cover 18.

Second Embodiment

Figure 28:
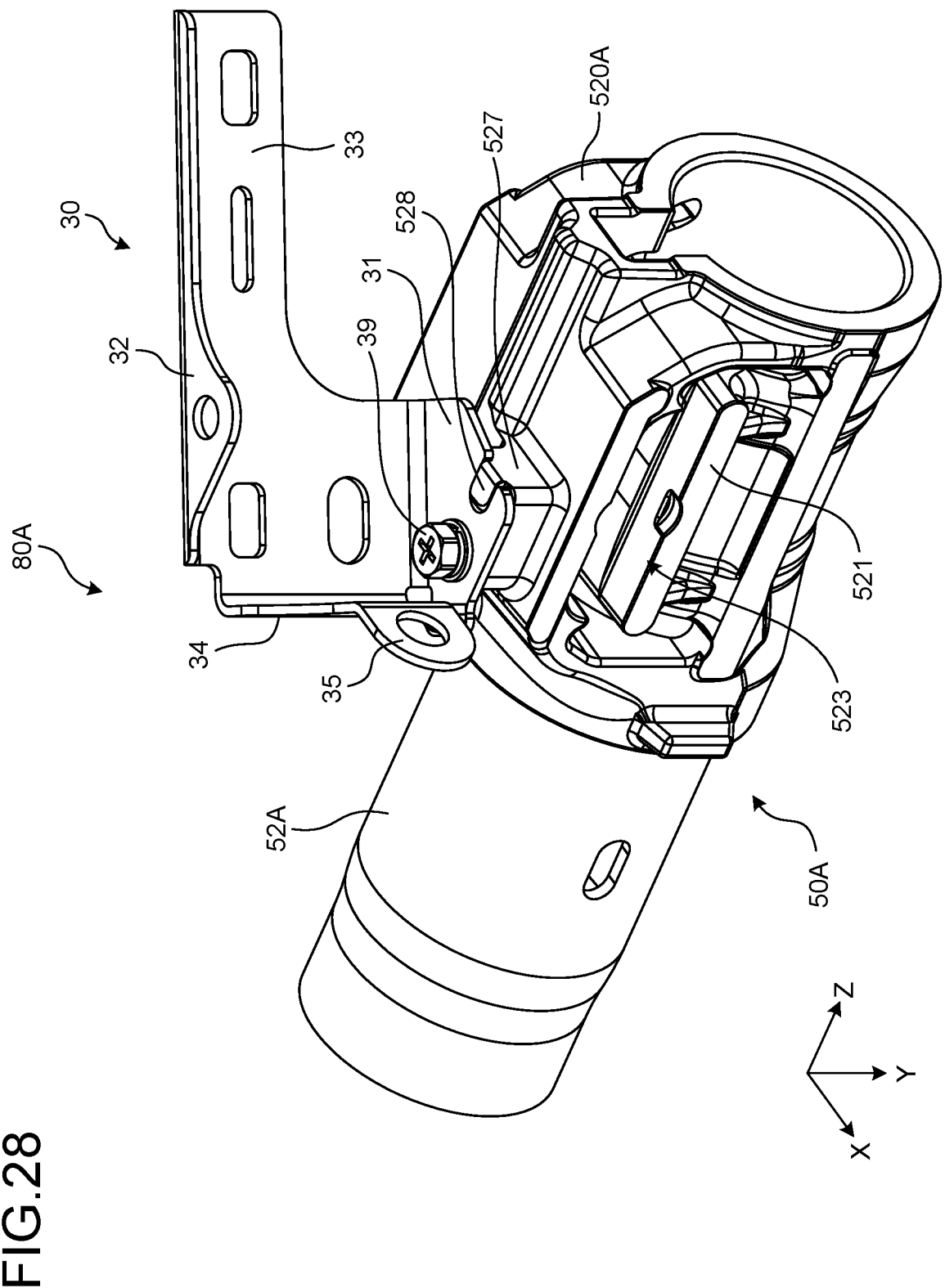
FIG. 28 is a perspective view of a steering column and a bracket according to a second embodiment.
Figure 29:
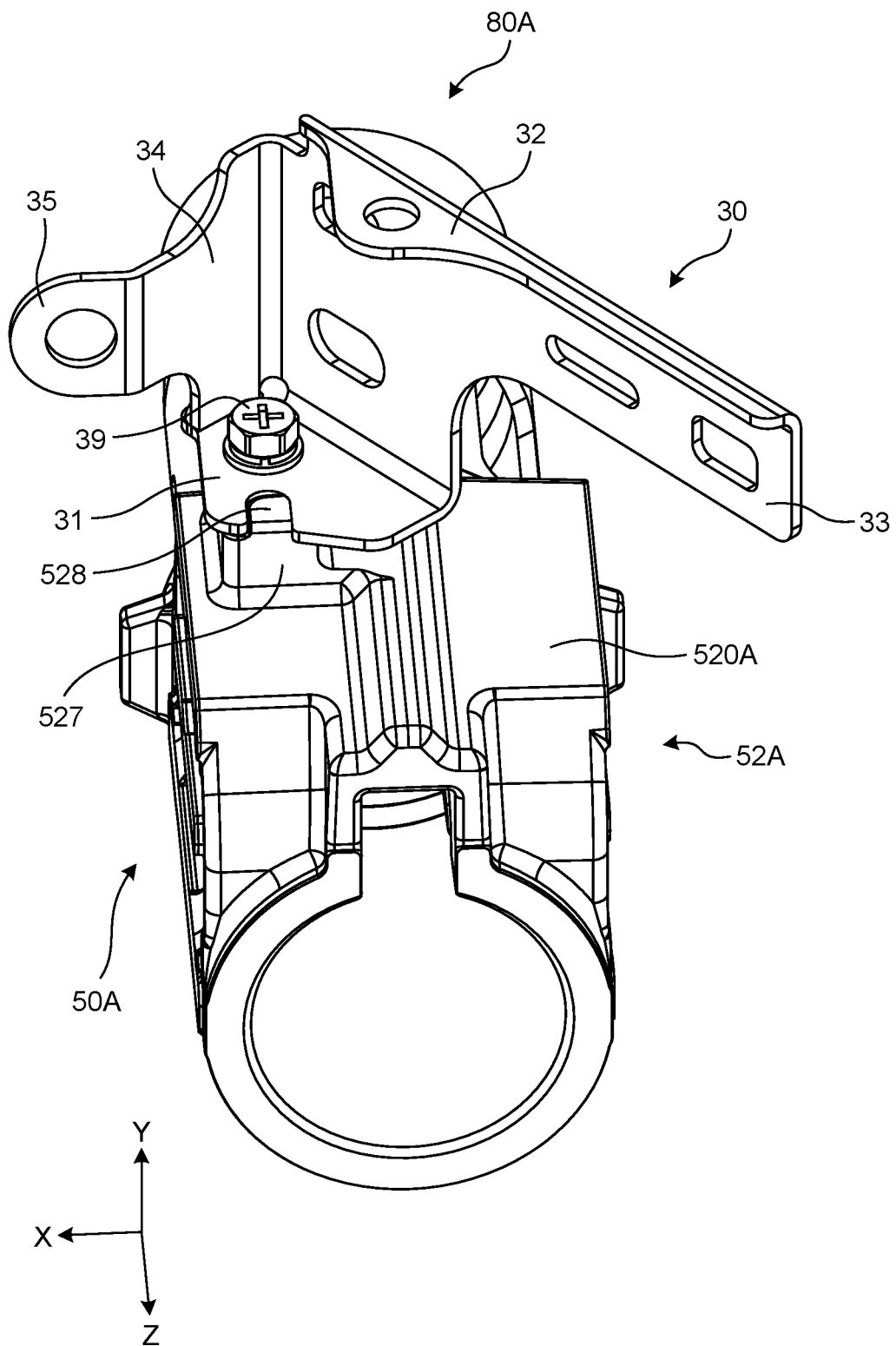
FIG. 29 is a perspective view of the steering column and the bracket according to the second embodiment.
Figure 30:
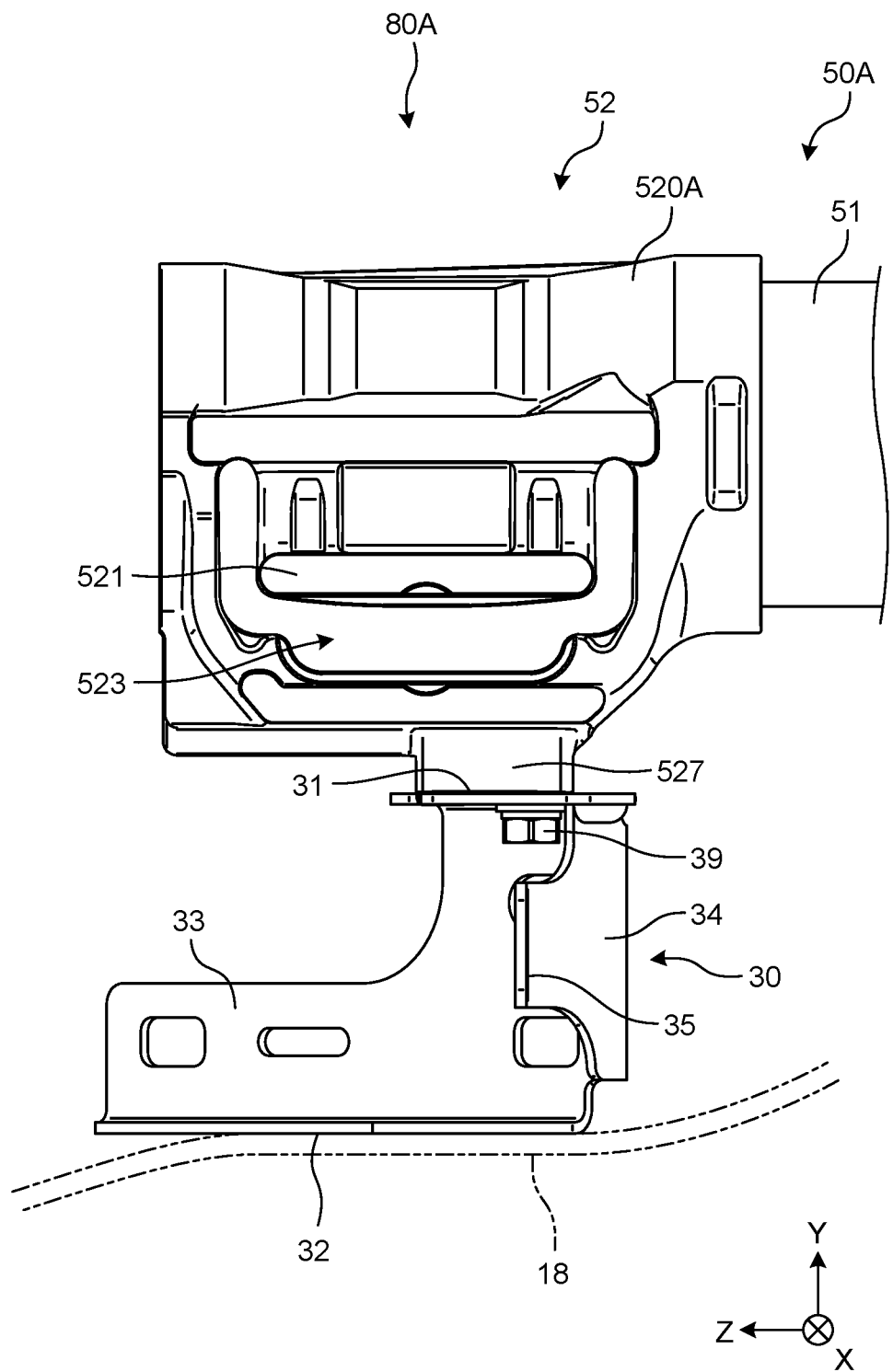
FIG. 30 is a front view of the steering column and the bracket according to the second embodiment.
Figure 31:
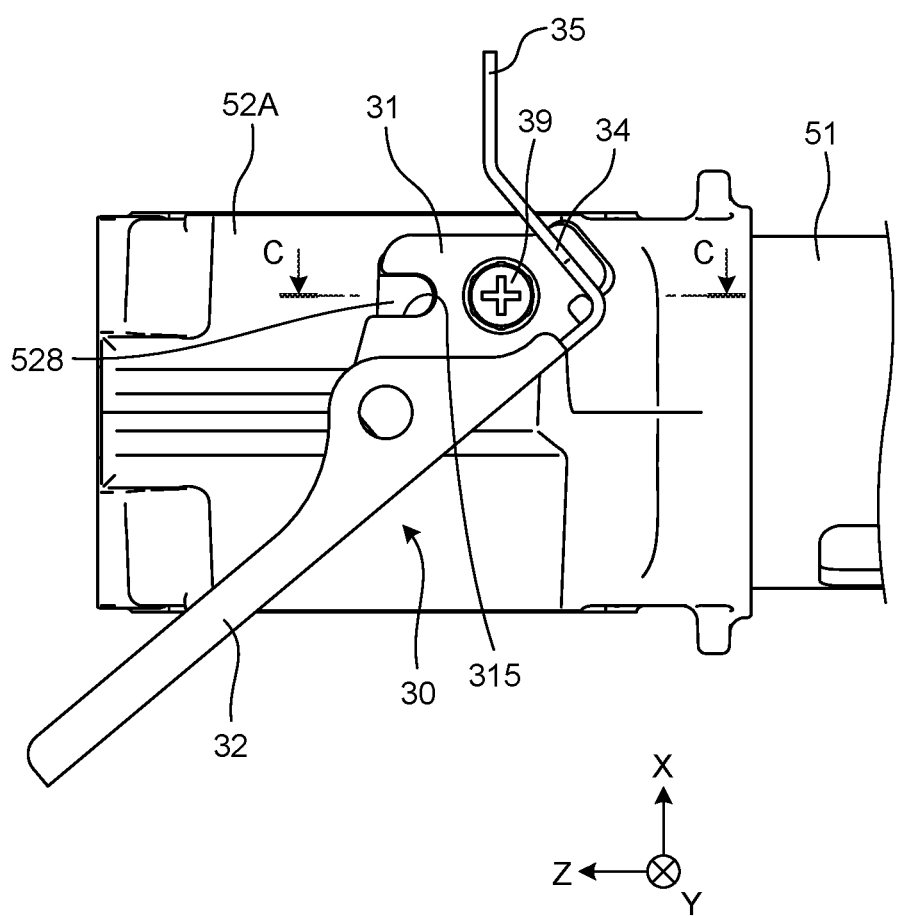
FIG. 31 is a bottom view of the steering column and the bracket according to the second embodiment.
Figure 32:
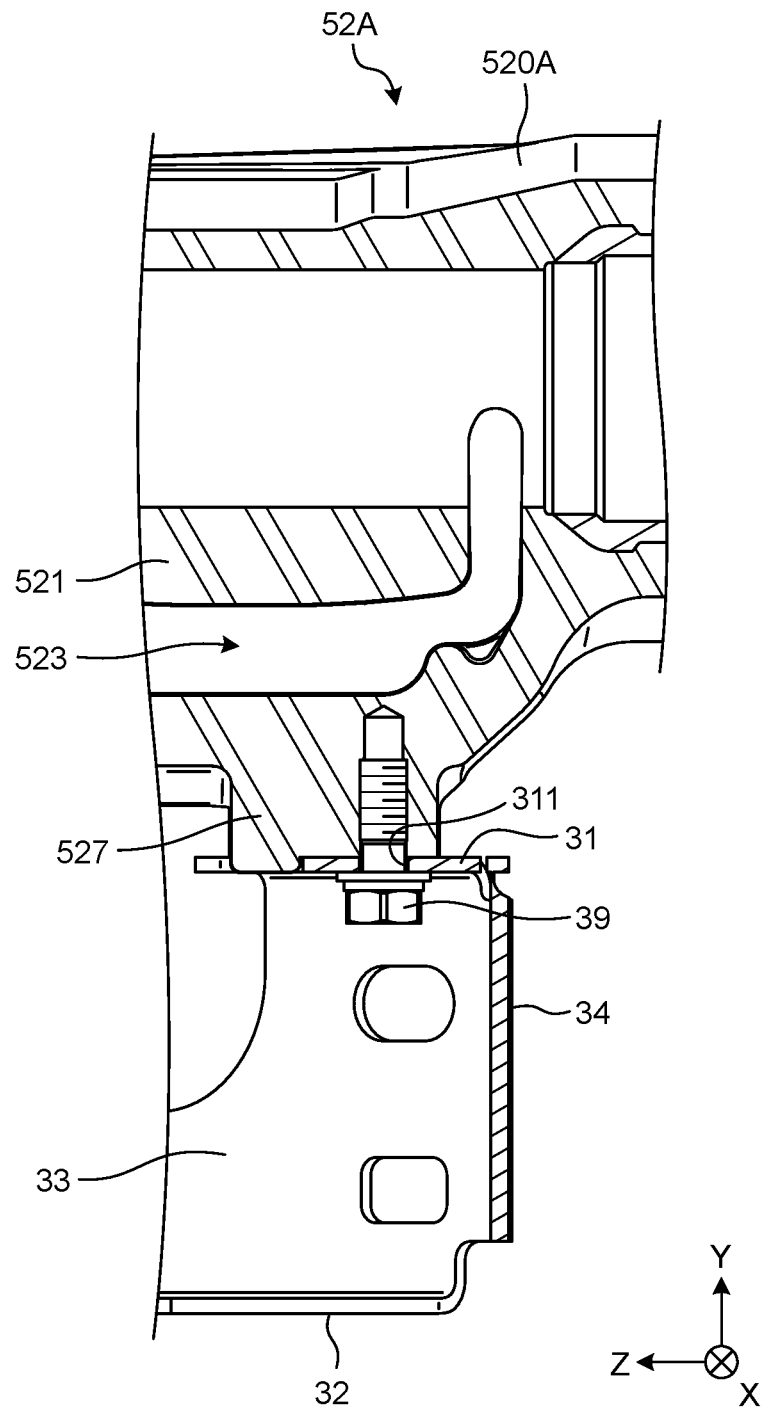
FIG. 32 is a cross-sectional view across C-C in FIG. 31.
Figure 33:
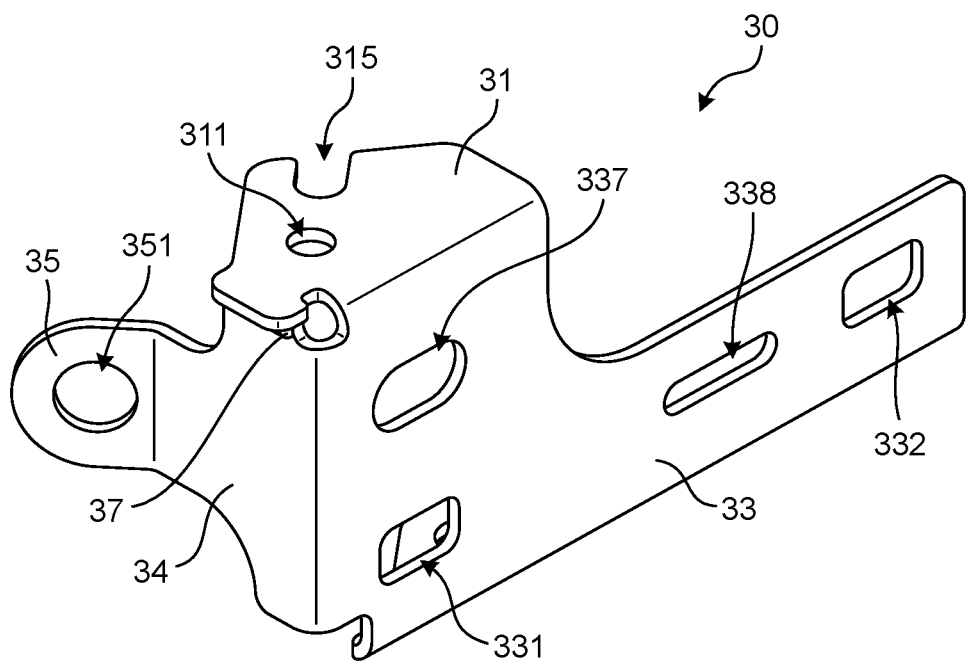
FIG. 33 is a perspective view of the bracket according to the second embodiment.
Figure 34:
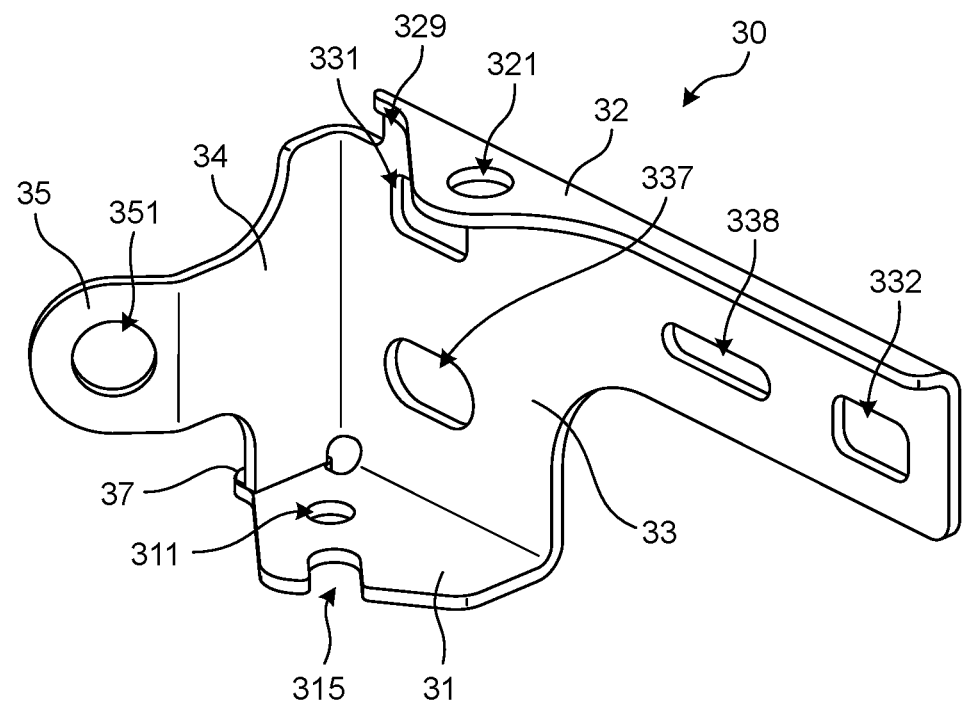
FIG. 34 is a perspective view of the bracket according to the second embodiment.
Figure 35:
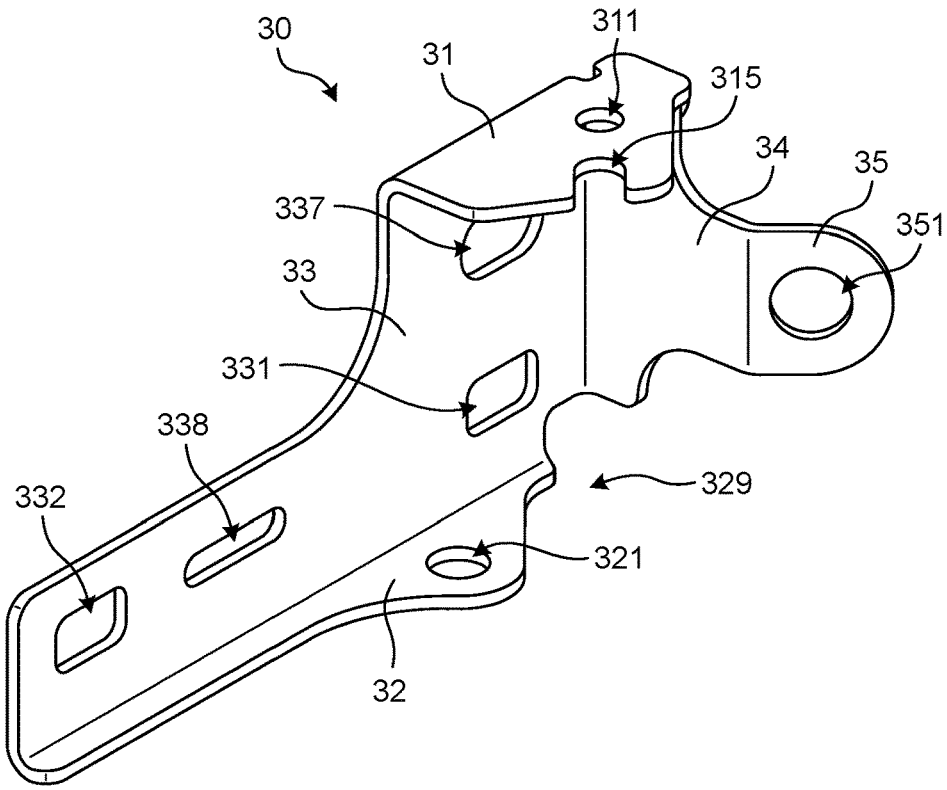
FIG. 35 is a perspective view of the bracket according to the second embodiment.
Figure 36:
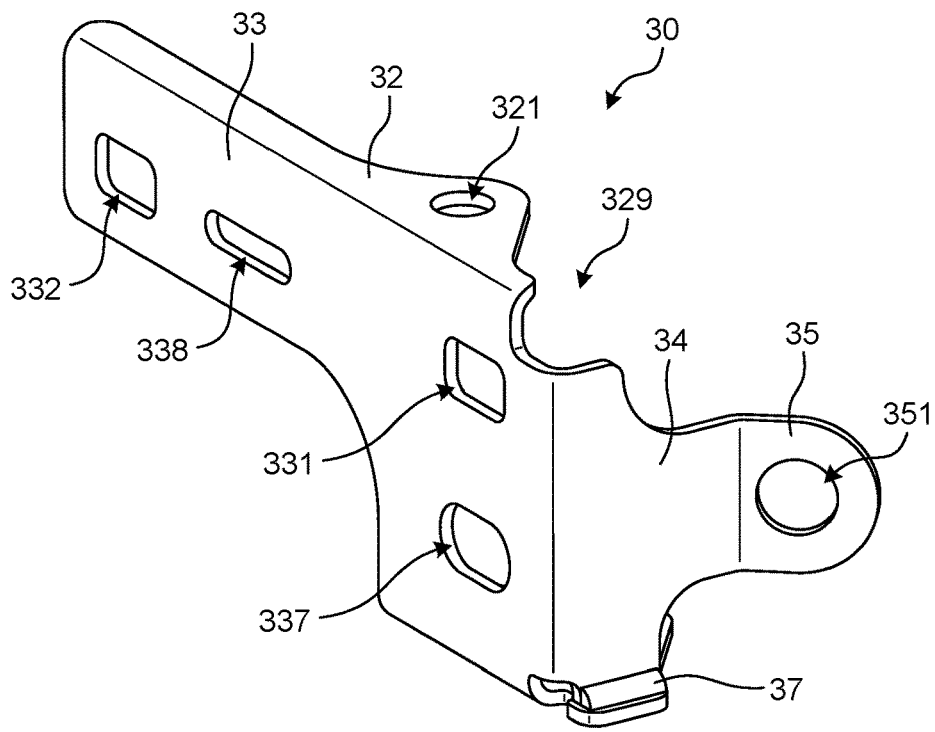
FIG. 36 is a perspective view of the bracket according to the second embodiment.
Figure 37:
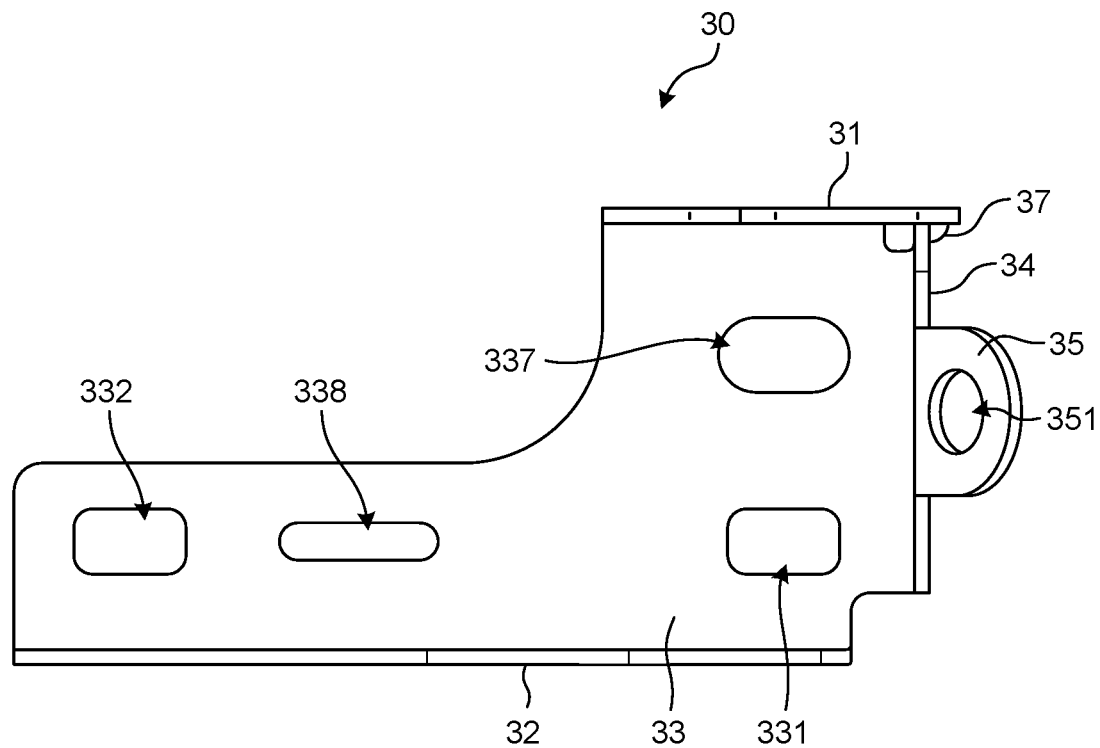
FIG. 37 is a front view of the bracket according to the second embodiment.
Figure 38:
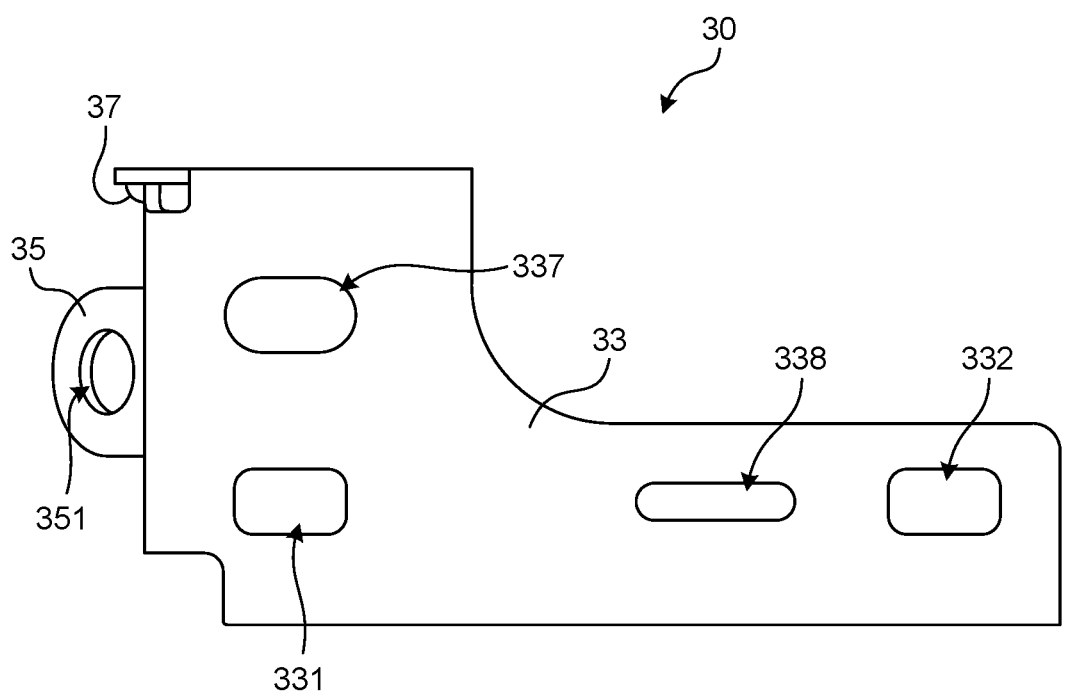
FIG. 38 is a rear view of the bracket according to the second embodiment.
Figure 39:
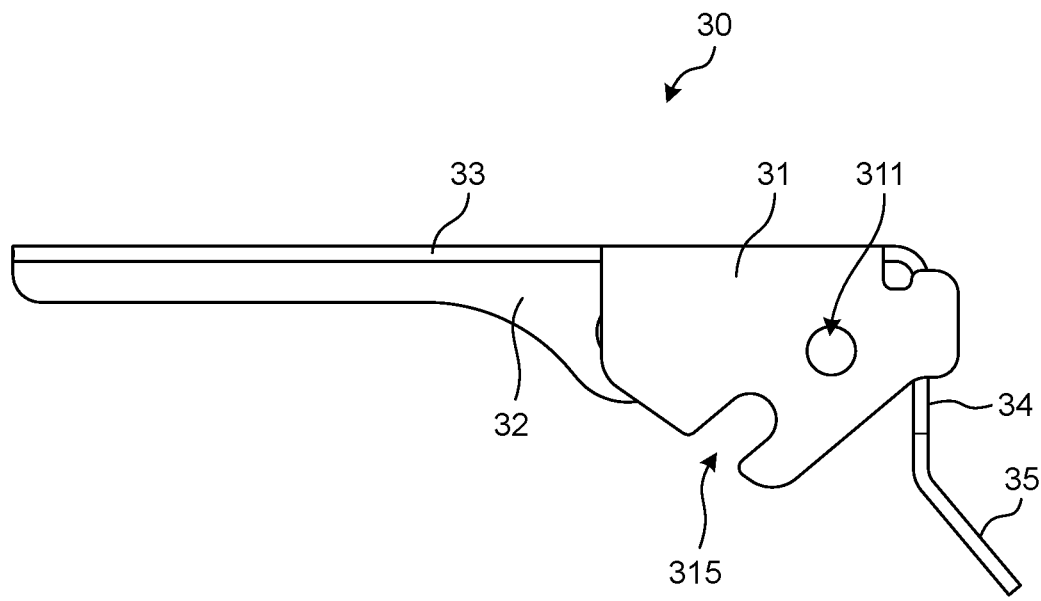
FIG. 39 is a plan view of the bracket according to the second embodiment.
Figure 40:
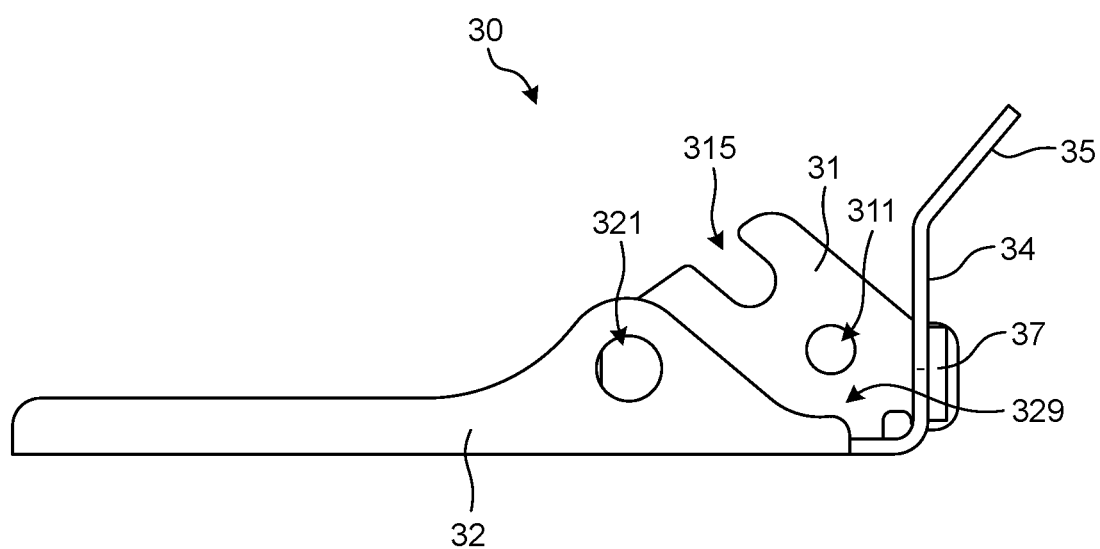
FIG. 40 is a bottom view of the bracket according to the second embodiment.
Figure 41:
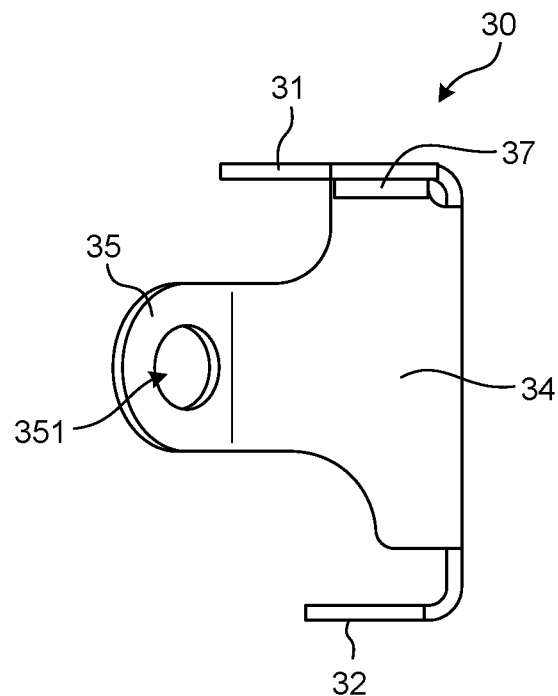
FIG. 41 is a right side view of the bracket according to the second embodiment.
Figure 42:
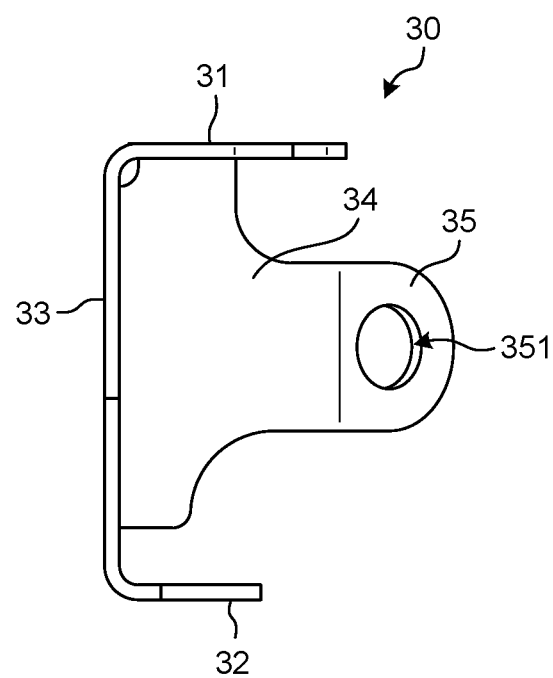
FIG. 42 is a left side view of the bracket according to the second embodiment.

FIG. 28 is a perspective view of the steering column and the bracket according to the second embodiment. FIG. 29 is a perspective view of the steering column and the bracket according to the second embodiment. FIG. 30 is a front view of the steering column and the bracket according to the second embodiment. FIG. 31 is a bottom view of the steering column and the bracket according to the second embodiment. FIG. 32 is a cross-sectional view across C-C in FIG. 31. FIG. 33 is a perspective view of the bracket according to the second embodiment. FIG. 34 is a perspective view of the bracket according to the second embodiment. FIG. 35 is a perspective view of the bracket according to the second embodiment. FIG. 36 is a perspective view of the bracket according to the second embodiment. FIG. 37 is a front view of the bracket according to the second embodiment. FIG. 38 is a rear view of the bracket according to the second embodiment. FIG. 39 is a plan view of the bracket according to the second embodiment. FIG. 40 is a bottom view of the bracket according to the second embodiment. FIG. 41 is a right side view of the bracket according to the second embodiment. FIG. 42 is a left side view of the bracket according to the second embodiment. The elements that are the same as those explained in the first embodiment are given the same reference signs, and redundant explanations thereof will be omitted.

As illustrated in FIG. 28, this steering apparatus 80A according to the second embodiment includes a steering column 50A and a bracket 30. The steering column 50A includes a lower column 52A.

As illustrated in FIG. 28, the lower column 52A has a seat 527 and a protrusion 528. The seat 527 is disposed on the bottom surface of the main body 520. The seat 527 protrudes in the −Y direction from the bottom surface of the main body 520. The protrusion 528 is disposed on the surface of the seat 527 on the side in the −Y direction. The longitudinal direction of the protrusion 528 follows the Z axis.

The bracket 30 is a member for supporting the column cover 18, and is a member for supporting the wire harness 15. As illustrated in FIGS. 33 to 42, the bracket 30 includes a first plate 31, a second plate 32, a third plate 33, a fourth plate 34, a fifth plate 35, and a welding bead 37.

As illustrated in FIG. 30, the first plate 31 faces the steering column 50A. The first plate 31 faces the bottom surface of the main body 520 of the lower column 52A. The first plate 31 is a flat plate. The first plate 31 extends in parallel with the bottom surface of the main body 520. As illustrated in FIG. 39, the width of the first plate 31 in the X direction is greater than the width of the main body 520 (the distance between the side plate 542 and the side plate 543) in the X direction. With this configuration, when the upper column 51 and the lower column 52A move in the Y direction, the first plate 31 does not interfere with the side plate 542 and the side plate 543. As illustrated in FIG. 33, the first plate 31 has a first attachment hole 311 and a positioning hole 315. As illustrated in FIG. 32, an attaching member 39 is passed through the first attachment hole 311. The attaching member 39 is a member for attaching the first plate 31 to the lower column 52A. The attaching member 39 is a bolt, for example. The positioning hole 315 is a long hole. As illustrated in FIG. 31, the protrusion 528 provided to the lower column 52A is fitted into the positioning hole 315. With this configuration, a rotation of the first plate 31 is restricted.

As illustrated in FIG. 30, the second plate 32 faces the column cover 18. The second plate 32 is a flat plate. As illustrated in FIG. 34, the second plate 32 extends in parallel with the first plate 31. The second plate 32 has a second attachment hole 321 and a cutout 329. The attaching member for attaching the column cover 18 to the bracket 30 is passed through the second attachment hole 321. The attaching member is a bolt, for example. As illustrated in FIG. 40, the second plate 32 is offset from the first attachment hole 311 in a plan view perpendicular to the passing direction through the first attachment hole 311 (in a plan view perpendicular to the first plate 31). In other words, the cutout 329 is disposed at a position overlapping with the first attachment hole 311 in a plan view perpendicular to the passing direction through the first attachment hole 311. With this configuration, it is possible to insert the attaching member 39 into the first attachment hole 311, from the side of the second plate 32.

As illustrated in FIG. 34, the third plate 33 connects the first plate 31 and the second plate 32. The third plate 33 is a flat plate. The third plate 33 intersects with the first plate 31 and the second plate 32. For example, the third plate 33 intersects perpendicularly with the first plate 31 and the second plate 32. The third plate 33 has a clip hole 331, a clip hole 332, a weight-reducing hole 337, and a weight-reducing hole 338. The clip 16 for supporting the wire harness 15 (see FIG. 6) is attached to the clip hole 331. The clip 17 (see FIG. 6) for supporting the wire harness 15 is attached to the clip hole 332. The weight-reducing hole 337 and the weight-reducing hole 338 are holes for reducing the weight of the bracket 30.

As illustrated in FIG. 34, the fourth plate 34 is connected to the first plate 31 and the third plate 33. The fourth plate 34 is a flat plate. The fourth plate 34 intersects with the first plate 31 and the third plate 33. For example, the fourth plate 34 intersects perpendicularly with the first plate 31 and the third plate 33.

As illustrated in FIG. 34, the fifth plate 35 is connected to the fourth plate 34. The fifth plate 35 is a flat plate. The fifth plate 35 intersects with the fourth plate 34. For example, the angle formed by the fifth plate 35 and the fourth plate 34 is an obtuse angle. As illustrated in FIG. 31, the fifth plate 35 intersects perpendicularly with the Z axis. The fifth plate 35 has an attaching portion 351. The attaching portion 351 is a hole.

A jig for suspending the steering apparatus 80A is attached to the attaching portion 351 provided to the fifth plate 35. A jig is a hook of hoisting equipment (hoist), for example. When the steering apparatus 80A is suspended on the jig, a load is imposed on the bracket 30. A stress is likely to be generated in the portion where the fourth plate 34 is connected with the first plate 31. Therefore, there is a chance for the bracket 30 going through a deformation. The bracket 30 according to the second embodiment includes the first plate 31, the second plate 32, the third plate 33, and the fourth plate 34. With the fourth plate 34 intersecting with the first plate 31 and the third plate 33, the rigidity of the bracket 30 is increased. Therefore, even when a load is imposed on the fifth plate 35, a deformation of the bracket 30 is suppressed.

As illustrated in FIG. 36, the welding bead 37 is disposed in a manner in contact with the first plate 31 and the fourth plate 34. The welding bead 37 is disposed along the boundary between the first plate 31 and the fourth plate 34. The welding bead 37 is disposed on the opposite side of the first attachment hole 311 with respect to the fourth plate 34. In other words, the first attachment hole 311, the fourth plate 34, and the welding bead 37 are disposed in the order listed herein, on the plane extending in parallel with the first plate 31. The welding bead 37 is disposed along the corner formed by the first plate 31 and the fourth plate 34. The cross-sectional shape of the welding bead 37 across a plane perpendicular to both of the first plate 31 and the fourth plate 34 is substantially a triangle.

When the steering apparatus 80A is suspended on the jig attached to the attaching portion 351 provided to the fifth plate 35, a force is exerted onto the fourth plate 34 in a direction moving away from the first plate 31. With the first attachment hole 311, the fourth plate 34, and the welding bead 37 disposed in the order listed herein, a compressing force is exerted on the welding bead 37 when the steering apparatus 80A is suspended. The welding bead 37 does not easily get deformed by the compressing force. The welding bead 37 suppresses the deformation of the bracket 20 when the steering apparatus 80A is suspended.

The bracket 30 is manufactured by plastically deforming one plate and welding, for example. The one plate that is the material of the bracket 30 is thinner than the one plate that is the material of the bracket 20 according to the first embodiment. The thickness of the one plate that is the material of the bracket 30 is approximately 2.3 mm or so, for example. In the process of manufacturing the bracket 30, the one plate is bent, to begin with. With this configuration, the first plate 31, the second plate 32, and the third plate 33 connected to one another, and the fourth plate 34 connected to the third plate 33 but not to the first plate 31 are formed. The first plate 31 and the fourth plate 34 are then welded together. With this configuration, the welding bead 37 is formed. With the welding bead 37, the first plate 31 and the fourth plate 34 are connected to each other.

The bracket 30, however, does not necessarily need to be manufactured by bending and welding. The method for manufacturing the bracket 30 is not limited to a particular method. The shape of the bracket 30 is also not limited to the shape described above. The angle formed by the fourth plate 34 with the first plate 31 and the third plate 33 does not necessarily need to be 90 degrees, and may be an acute angle or an obtuse angle. The first plate 31, the second plate 32, the third plate 33, the fourth plate 34, and the fifth plate 35 do not need to be flat plates, and may be a curved surface, for example.

The attaching portion 351 provided to the fifth plate 35 does not necessarily need to be a hole. For example, the attaching portion 351 provided to the fifth plate 35 may be a hook, for example. Furthermore, the bracket 30 does not necessarily need to be provided with the fifth plate 35.

The first plate 31 does not necessarily need to be provided with the positioning hole 315. For example, the steering column 50A may be provided with a recess, and the first plate 31 may be provided with a protrusion to be fitted into the recess on the steering column 50A. In other words, one of the steering column 50A and the first plate 31 may be provided with a recess, and the other one of the steering column 50A and the first plate 31 may be provided with a protrusion fitted into the recess.

As explained above, the bracket 30 includes the first plate 31 that faces the steering column 50A, the second plate 32 that faces the column cover 18 for covering the steering column 50A, the third plate 33 that connects the first plate 31 and the second plate 32, and the fourth plate 34 that intersects with the first plate 31 and the third plate 33.

With the fourth plate 34 intersecting with the first plate 31 and the third plate 33, the rigidity of the bracket 30 is increased. With this configuration, even when a member other than the column cover 18 (e.g., the wire harness 15 or jig) is attached to the bracket 30, a deformation of the bracket 30 is suppressed. Therefore, the bracket 30 can suppress a displacement of the position where the column cover 18 is attached.

The bracket 30 has the welding bead 37 that is in contact with the first plate 31 and the fourth plate 34. With this configuration, the rigidity of the bracket 30 is further increased. Therefore, the bracket 30 can further suppress a displacement of the position where the column cover 18 is attached.

In the bracket 30, the first plate 31 has the first attachment hole 311 through which the attaching member 39 for attaching the first plate 31 to the steering column 50A is passed. The second plate 32 is offset from the first attachment hole 311 in a plan view perpendicular to the passing direction through the first attachment hole 311. With this configuration, it is possible to insert the attaching member 39 into the first attachment hole 311 from the side of the second plate 32. The bracket 30 can improve the easiness of the task of attaching the steering column 50A.

In the bracket 30, the third plate 33 has the clip holes (the clip hole 331, the clip hole 332) for attaching the clips (the clip 16 or the clip 17) that support the wire harness 15. With this configuration, the bracket 30 can improve the easiness of the task of attaching the wire harness 15.

The steering apparatus 80A includes the bracket 30 and the steering column 50A. With this configuration, the steering apparatus 80A can suppress a displacement of the position where the column cover 18 is attached.

The steering apparatus 80A has a recess (e.g., the positioning hole 315) provided to one of the steering column 50A and the first plate 31, and the protrusion 528 provided to one of the steering column 50A and the first plate 31, and fitted into the recess. With this configuration, the bracket 30 is positioned by the recess and the protrusion 528. As long as there is at least one attaching member 39, it is possible to attach the bracket 30 to the steering column 50A and to position the bracket 30. The steering apparatus 80A can improve the easiness of the task of attaching the bracket 30.

In the steering apparatus 80A, the bracket 30 is disposed under the steering column 50A (in -Y direction). With this configuration, it is possible to attach the column cover 18 to the bracket 30 from the opposite side of the vehicle body, with respect to the steering column 50A. The steering apparatus 80A can improve the easiness of the task of attaching the column cover 18.

REFERENCE SIGNS LIST 12 key lock
13 switch
15 wire harness
16, 17 clip
18 column cover
20 bracket
21 first plate
215 positioning hole
22 second plate
229 cutout
23 third plate
231, 232 clip hole
235 positioning hole
24 fourth plate
25 fifth plate
251 attaching portion
29 attaching member
30 bracket
31 first plate
315 positioning hole
32 second plate
329 cutout
33 third plate
331, 332 clip hole
337, 338 weight-reducing hole
34 fourth plate
35 fifth plate
351 attaching portion
37 welding bead
39 attaching member
50, 50A steering column
51 upper column
52, 52A lower column
520 main body
521 movable part
523 slit
525, 527 seat
526, 528 protrusion
53 first support member
54 second support member
541 top plate
542, 543 side plate
542a, 543a long hole
60 fastening mechanism
61 rod
62 stationary cam
63 rotating cam
64 lever
66 nut
67 thrust bearing
68 spacer
80, 80A steering apparatus
81 steering wheel
82 steering shaft
82a input shaft
82b output shaft
83 steering effort assisting mechanism
85 intermediate shaft
87 pinion shaft
88 steering gear
88a pinion
88b rack
89 tie rod
90 ECU
92 decelerator
93 electric motor
94 torque sensor
95 speed sensor
98 ignition switch
99 power source apparatus
101, 102 the body-side member
Z rotational axis

The invention claimed is:

1. A bracket comprising:
a first plate that faces a steering column;
a second plate that faces a column cover covering the steering column;
a third plate that connects the first plate and the second plate; and
a fourth plate that intersects with the first plate and the third plate,
wherein the second plate extends in parallel with the first plate and is not disposed in parallel with any of the third plate and the fourth plate.

2. The bracket according to claim 1, further comprising a welding bead that is in contact with the first plate and the fourth plate.

3. The bracket according to claim 1, wherein the fourth plate intersects with the second plate.

4. The bracket according to claim 1, wherein the third plate has a clip hole to which a clip for supporting a wire harness is attached.

5. A steering apparatus comprising:
the bracket according to claim 1; and
the steering column.

6. The steering apparatus according to claim 5, further comprising:
a recess that is provided to one of the steering column and the first plate, and
a protrusion that is provided to one of the steering column and the first plate, and that is fitted into the recess.

7. The steering apparatus according to claim 5, wherein the bracket is disposed under the steering column.

8. A bracket comprising:
a first plate that faces a steering column;
a second plate that faces a column cover covering the steering column;
a third plate that connects the first plate and the second plate; and a fourth plate that intersects with the first plate and the third plate,
wherein
the fourth plate intersects with the second plate,
the third plate has a first end hole that is disposed at an end on a side of the fourth plate,
the fourth plate has a second end hole that is disposed at an end on a side of the third plate, and
the second end hole is connected with the first end hole.

9. A bracket comprising:
a first plate that faces a steering column;
a second plate that faces a column cover covering the steering column;
a third plate that connects the first plate and the second plate; and
a fourth plate that intersects with the first plate and the third plate, wherein
the second plate extends in parallel with the first plate,
the first plate has a first attachment hole through which an attaching member for attaching the first plate to the steering column is passed, and
the second plate is offset from the first attachment hole in a plan view perpendicular to a passing direction through the first attachment hole.

10. A bracket comprising:
a first plate that faces a steering column;
a second plate that faces a column cover covering the steering column;
a third plate that connects the first plate and the second plate; and
a fourth plate that intersects with the first plate and the third plate,
wherein the second plate extends in parallel with the first plate and is not disposed in parallel the third plate, and
wherein the third plate has a clip hole to which a clip for supporting a wire harness is attached.

* * * * *